(12) United States Patent (10) Patent No.: US 7,373,143 B2
Dygert (45) Date of Patent: May 13, 2008

(54) ADAPTIVE RADIO PATCH INTERFACE SYSTEM

(75) Inventor: Roger Lee Dygert, Durhamville, NY (US)

(73) Assignee: Par Technology Corporation, New Hartford, NY (US)

( * ) Notice: Subject to any disclaimer, the term of this patent is extended or adjusted under 35 U.S.C. 154(b) by 0 days.

(21) Appl. No.: 11/058,815

(22) Filed: Feb. 16, 2005

(65) Prior Publication Data

US 2006/0234691 A1 Oct. 19, 2006

(51) Int. Cl.
*H04M 3/00* (2006.01)
*G06F 13/00* (2006.01)
*G06F 9/30* (2006.01)
*G06F 9/44* (2006.01)

(52) U.S. Cl. ............... 455/418; 710/100; 712/200; 719/328

(58) Field of Classification Search ........... 455/140, 455/552.1, 337, 293, 336, 418; 710/100; 712/200; 719/328
See application file for complete search history.

(56) References Cited

U.S. PATENT DOCUMENTS

| | | | | |
|---|---|---|---|---|
| 5,745,532 A | * | 4/1998 | Campana, Jr. | ............ 375/347 |
| 6,823,181 B1 | * | 11/2004 | Kohno et al. | ............ 455/324 |
| 2006/0046773 A1 | * | 3/2006 | Aycin et al. | ............ 455/552.1 |
| 2006/0063507 A1 | * | 3/2006 | Iancu | ............ 455/337 |
| 2006/0148441 A1 | * | 7/2006 | Zinser | ............ 455/336 |

* cited by examiner

*Primary Examiner*—Naghmeh Mehrpour
(74) *Attorney, Agent, or Firm*—George R. McGuire; Bond Schoeneck & King, PLLC

(57) ABSTRACT

The present invention is directed to an RF communications system that includes a first radio processor module having a first receiver portion programmed to convert a first analog receive signal into a first digital audio receive signal. The first analog receive signal conforms to a first set of radio signal parameters. A digital interconnection system is coupled to the first radio processor module. At least one second radio processor module is coupled to the digital interconnection system. The at least one second radio processor module includes at least one second transmission portion programmed to obtain the first digital audio receive signal via the digital interconnection system and convert the first digital audio receive signal into at least one second analog transmit signal conforming to at least one set of second radio signal parameters.

50 Claims, 15 Drawing Sheets

ADAPTIVE RADIO PATCH INTERFACE SYSTEM

BACKGROUND OF THE INVENTION

1. Field of the Invention

The present invention relates generally to the field of radio communications, and particularly to software-defined radios.

2. Description of Prior Art

Responding to emergencies and disasters typically involves a variety of agencies that use differing radio architectures. Standard protocol is for one agency ("lead agency") to assume primary responsibility for coordinating the disaster response and establish a command and control facility. Other agencies ("subordinate agencies") receive direction from the lead agency and must therefore be in communication with the command and control facility and, perhaps, with other responding agencies. The lead agency is required to communicate with all individuals involved in the disaster response and coordinate activities of the subordinate agencies to form a cohesive unit.

Until now, handling of the communications in such an event was unreliable because of the variety of communication equipment used by the various agencies that might be involved. For example, some disaster response agencies use radios in the 450 MHz band, others use radios in the 800 MHz or 150 MHz bands. In addition, it is often necessary for the lead agency or a subordinate agency to communicate with a party outside of radio range, for example, using telephone or other non-radio means. If the lead agency does not have on hand all the radios and other equipment necessary to communicate with each individual and agency involved in the disaster response, a gathering and exchange effort has to take place. Helicopters, for example, have to find a place to land and acquire a radio compatible with the lead agency, and police, FBI, Coast Guard, and other agencies have to exchange or donate radios to permit communication between all of the responding agencies. Often these radios are in high demand due to the situation and thus may not be available in necessary quantities.

What is needed is a simple and convenient system that allows disaster response agencies to communicate with other disaster response agencies that use dissimilar communications equipment. What is further needed is a simple and convenient system that allows disaster response agencies at the disaster scene to communicate with agencies beyond radio communication range of the disaster scene, using a combination of radio and non-radio communications.

SUMMARY OF THE INVENTION

The present invention addresses the needs described above. The present invention provides a software defined radio system that allows agencies to communicate. The software defined radio system emulates each dissimilar radio. Dissimilar radios are patched by routing each radio's digital audio using an internal high speed buss. Accordingly, communications between all responding agencies, despite agency equipment differences, may be instantaneously provided by the present invention.

One aspect of the present invention is directed to a software defined radio communications system that includes a first programmable circuit programmed to convert a first digital audio signal into a first analog transmit signal and convert a first analog receive signal into a first digital receive signal. The first analog transmit signal and the first analog receive signal conform to a first set of radio signal parameters characterizing a first radio communications channel. At least one second programmable circuit is coupled to the first programmable circuit. The at least one second programmable circuit is programmed to convert at least one second digital transmit signal into at least one second analog transmit signal and convert at least one second analog receive signal into at least one second digital receive signal. The at least one second analog transmit signal and the at least one second analog receive signal conform to at least one second set of radio signal parameters characterizing at least one second radio communications channel. The first programmable circuit and the at least one second programmable circuit are identical. A digital highway couples the first programmable circuit and the at least one second programmable circuit. The first digital receive signal is provided to any one of the at least one second programmable circuits and the at least one second digital receive signal is provided to the first programmable circuit. A control system is configured to program the first programmable circuit to conform to the first set of radio signal parameters, program the at least one second programmable circuit to conform to the at least one second set of radio signal parameters, and to program the first programmable circuit and the at least one second programmable circuit to conform to a predetermined radio communications channel patching arrangement. Each radio monitors all of the channels assigned to it and patches a channel when activity is detected. The controller (Host) does not have to intervene. One programmed the radios perform all radio and patching functions autonomously.

In another aspect, the present invention is directed to a software defined radio communications system that includes a first programmable radio programmed to convert a first digital audio signal into a first analog transmit signal and convert a first analog receive signal into a first digital receive signal. The first analog transmit signal and the first analog receive signal conform to a first set of radio signal parameters characterizing a first radio communications channel. The first programmable radio is configured to transmit the first analog transmit signal and receive the first analog receive signal via the first radio communications channel. At least one second programmable radio is coupled to the first programmable circuit. The at least one second programmable circuit is programmed to convert at least one second digital transmit signal into at least one second analog transmit signal and convert at least one second analog receive signal into at least one second digital receive signal. The at least one second analog transmit signal and the at least one second analog receive signal conform to at least one second set of radio signal parameters characterizing at least one second radio communications channel. The at least one second programmable radio is configured to transmit the at least one second analog transmit signal and receive the at least one second analog receive signal via the at least one second radio communications channel. A digital highway couples the first programmable radio and the at least one second programmable radio. The first digital receive signal is provided to any one of the at least one second programmable radios and the at least one second digital receive signal being provided to the first programmable radio. A control system is configured to program the first programmable radio to conform to the first set of radio signal parameters, program the at least one second programmable radio to conform to the at least one second set of radio signal parameters, and to program the first programmable radio and the at least one second programmable radio to conform to a predetermined radio communications channel patching arrangement.

In yet another aspect, the present invention is directed to a computerized method for establishing RF communications. The method includes the steps of providing a first programmable radio and at least one second programmable radio; receiving a first RF receive signal with the first programmable radio; converting the first RF receive signal into a first analog receive signal, the first RF receive signal and the first analog receive signal conforming to a first set of signal parameters characterizing a first radio communications channel; converting the first analog receive signal into at least one second digital audio transmit signal; converting the at least one second digital audio transmit signal into at least one second analog transmit signal, the at least one second analog transmit signal conforming to at least one second set of communications characteristics characterizing at least one second radio communications channel; and converting the at least one second analog transmit signal into at least one second RF transmit signal for transmission over the at least one second radio communications channel.

In yet another aspect, the present invention is directed to a computerized RF communications system having a first radio signal processor, a second radio signal processor, a database, and a graphical user interface including a display and a data input device. The communications system performs a method for establishing communications between a first radio characterized by a first set of radio signal parameters and a second radio characterized by a second set of radio signal parameters. The method includes the steps of selecting a first template from the database, the first template including instructions to program a radio signal processor in accordance with the first set of radio signal parameters; applying the first template to the first radio signal processor, the first radio signal processor being programmed to convert a first digital audio transmit signal into a first analog transmit signal, and convert a first analog receive signal into a first digital audio receive signal, the first analog transmit signal and the first analog receive signal conforming to the first set of radio signal parameters; selecting a second template from the database, the second template including instructions to program a radio signal processor in accordance with the second set of radio signal parameters; applying the second template to the second radio signal processor, the second radio signal processor being programmed to convert a second digital audio transmit signal into a second analog transmit signal, and convert a second analog receive signal into a second digital audio receive signal, the second analog transmit signal and the second analog receive signal conforming to the second set of radio signal parameters; and patching the first radio signal processor and the second radio signal processor.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1A:
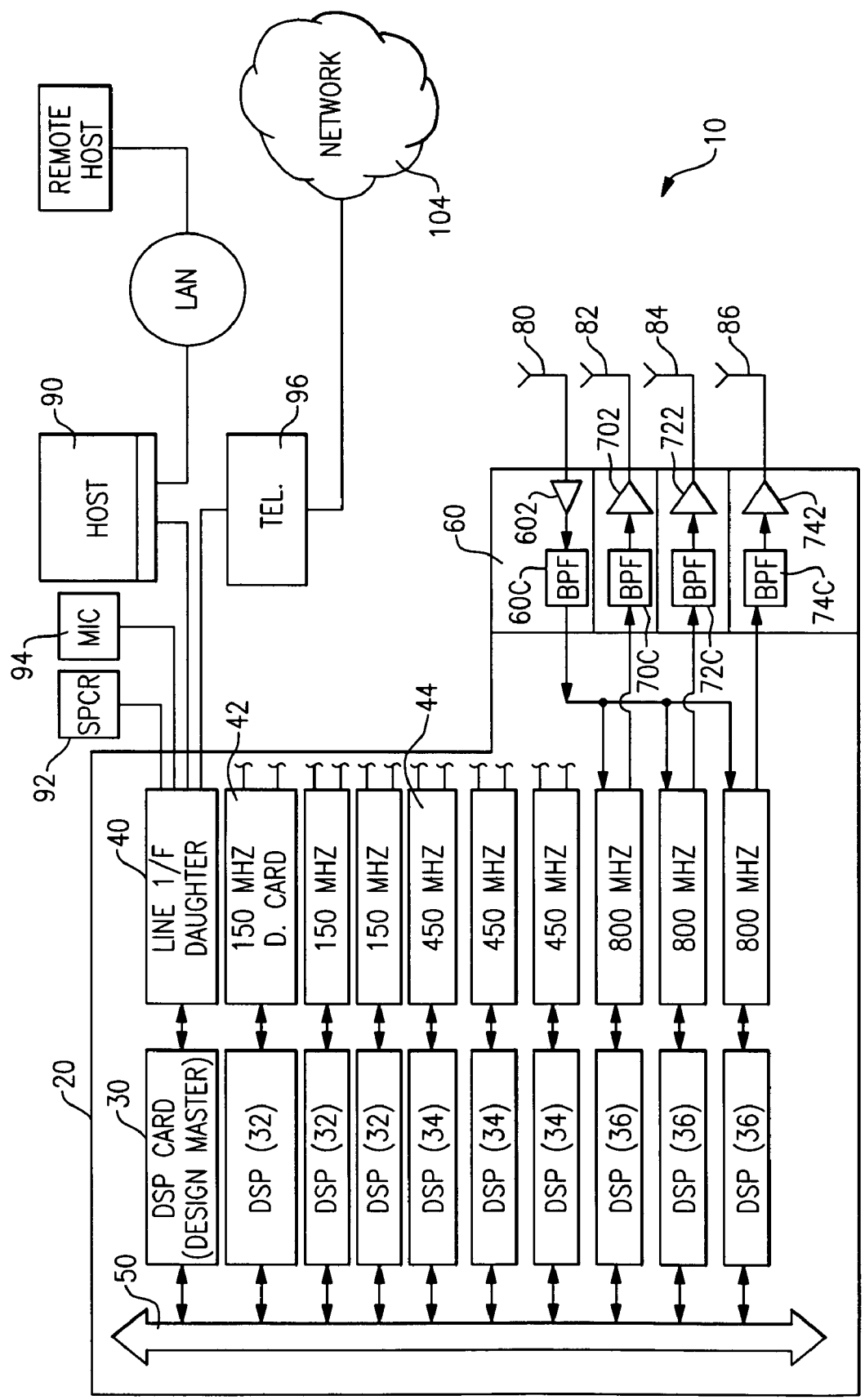
FIG. 1A is a system block diagram in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the adaptive software radio system of the present invention is shown in FIG. 1, and is designated generally throughout by reference numeral 10.

The present invention provides a system and method for patching dissimilar radios in software. Thus, the various and dissimilar agency radios establish communications with software defined radio system 10 and their own equipment. The software defined radio system 10 establishes communications patches between the dissimilar radios.

As embodied herein and depicted in FIG. 1A, a system block diagram in accordance with one embodiment of the present invention is disclosed. Software radio system 10 includes a dynamically programmable radio unit 20 coupled to host computer 90, console communications that include speaker 92 and microphone 94, and telephone device 96. Host computer 90 may be coupled to a local area network or a wide area network. System 20 may be controlled from a remote host 102 by way of external network 100. Of course, the telephonic device may be coupled to an external network 104.

Dynamically programmable radio unit 20 includes a plurality of DSP cards coupled to digital highway 50. DSP cards (30,32,34,36) are identical from a hardware standpoint. The functionality of the DSP card may be dynamically reconfigured in response to receiving commands from host computer 90. The DSP radio cards may be dynamically defined in software to support any variety of modulation formats, encryption, data formats, and/or other radio parameters. DSP 30 functions as a master DSP card. Master DSP card 30 is coupled to a line interface daughter card 40. Upon initialization, card 30 provides host 90 with a status message indicating that it is coupled to daughter card 40. Host 90 programs card 30 accordingly. Similarly, DSP cards 32 provide status messages indicating that they are coupled to 150 MHz RF daughter cards. Host 90 recognizes that DSP cards 32 are configured to communicate with external radios operating within the 150 MHz radio band. DSP cards 34 are programmed in the same way. By virtue of the fact that they are coupled to 450 MHz RF daughter cards 44, host 90 programs DSP cards 34 to be compatible with 450 MHz RF daughter cards 44. Finally DSP cards provide status messages indicating that they are coupled to 800 MHz daughter cards 46. In response, host 90 configures cards 36 accordingly.

Host 90 also dynamically programs DSP cards to effect the radio patching system. Each DSP card—daughter card pair (32/42, 34/44, and 36/46) are programmed and configured to emulate an external agency radio. The dynamically reconfigurable patching system allows various radios to communicate. Thus, a 150 MHz transmission is converted by a DSP card 32 into digital data. The digital data is converted into a 800 MHz format and retransmitted over an 800 MHz channel by a DSP card—daughter card pair 36/46.

Host computer 90 may be implemented using a lap top computer, a personal computer, or a work station. Host 90 may include any suitable processor. For example, many lap tops or PCs employ processors manufactured by Intel Inc. Further, host 90 may typically support the Windows NT™ operating system, or an operating system developed by Sun Microsystems Inc., or any other suitable operating system. Host 90 may include a random access memory (RAM) as well as other dynamic storage devices. The RAM is configured to store data, digital audio, status information, and instructions for use by the processor. RAM 30 may also be used for storing temporary variables or other intermediate information during execution of instructions by the processor. Host 90 may further include a read only memory (ROM) or other static storage device coupled to an internal bus for storing static information and instructions for the host processor. Host 90 may include additional storage devices, such as a magnetic disk or optical disk for long term storage of data and instructions.

Referring back to the daughter cards, line interface 40 couples DSP master card 30 to host computer 90, host operator communications facilities 92, 94, and telephonic device 96. As such, host commands are routed through master card 30. Further, operator audio may be patched into any radio communications channel by way of master card 40. Radio channel audio is provided to the operator in similar fashion. Line interface 40 and master card 30 allow audio from the telephonic device to be patched into a radio channel as well. For example, if the governor of a state calls the operator during an emergency, the governor is readily patched in to any or all of the radio channels supported by system 10 to provide instructions and/or gather information.

Each RF daughter card is also coupled to an RF transmitter and an RF receiver. For clarity of illustration, only the 800 MHz RF transceiver suite is shown in FIG. 1. In this embodiment, all of the 800 MHz cards 46 are coupled to a single receiver 60. Receiver 60 is coupled to antenna 80. 800 MHz transmissions are directed from antenna 80 into low noise amplifier (LNA) 602 and band pass filter (BPF) 600. In one embodiment, a baseband analog signal is provided to cards 46. In another embodiment, cards 46 receive an intermediate frequency (IF) signal. On the other hand, each card 46 is coupled to a separate transmitter. Card 46 may provide, for example, BPF 700 with an IF signal (or a baseband signal depending on the implementation). The band limited IF signal is modulated and directed into 35 W power amplifier 702. The resultant RF signal propagates from antenna 82 over the appropriate 800 MHz radio channel. Transmitters 72, 74 are identical to transmitter 70, and transmit antennas 84 and 86 are identical to antenna 82. Accordingly, any further discussion regarding these components is redundant.

Those of ordinary skill in the art will recognize that any suitable digital signal processor (DSP) may be employed in the present invention consistent with the processing requirements described herein. For example, the present invention may employ DSP cards that include off-the-shelf devices provided by Motorola, Analog Devices, Texas Instruments, or other such DSP device manufacturers. In one embodiment, the DSP cards include "PowerPC" processors.

Daughter interface card 40 provides a two-way data communication between master DSP card 30 and host 90. It will be apparent to those of ordinary skill in the pertinent art that modifications and variations can be made to communications interface card 40 of the present invention depending on the nature of the external connection. For example, with regard to the telephonic interface, interface card 40 may include digital subscriber line (DSL) modem, integrated services digital network (ISDN) circuitry, a cable modem, a telephone modem, or any other communication interface to provide a data communication connection to a corresponding type of communication line. As another example, communication interface 40 may be configured to support a local area network (LAN) connection (i.e., for Ethernet™ or an Asynchronous Transfer Model (ATM) network) to provide a data communication connection to a compatible LAN. Wireless links may also be implemented. In any such implementation, communication interface 40 sends and receives electrical, electromagnetic, or optical signals that carry digital data streams representing various types of information. Further, communication interface 40 may include peripheral interface devices, such as a Universal Serial Bus (USB) interface, a PCMCIA (Personal Computer Memory Card International Association) interface, etc, for communications with host 90.

The term "computer-readable medium" as used herein refers to any medium that participates in providing data and/or instructions to the CPU disposed in host 90, or to any of the DSP cards (30, 32, 34, and/or 36) for execution. Such a medium may take many forms, including but not limited to non-volatile media, volatile media, and transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, E²PROM, a FLASH-EPROM, any other memory chip or cartridge, a carrier wave, or any other medium from which a computer can read.

Transmission media between programmable radio unit 20 and host 90, the LAN, and/or the telecommunication network may include coaxial cables, copper wire and fiber optics. Those of ordinary skill in the art will recognize that transmission media can also take the form of acoustic, optical, or electromagnetic waves, such as those generated during radio frequency (RF) and infrared (IR) data communications.

Referring back to FIG. 1A, each DSP radio card 32,34,36 are coupled to RF daughter cards 42, 44, 46, respectively. As will be described below, each DSP card includes a transmitter portion that provides a corresponding daughter card with an in-phase (I) and quadrature (Q) signal for quadrature FM modulation by the transmitter. As noted below, other forms of quadrature carrier multiplexing may be employed as well. Alternatively, a DSP card may provide a single channel signal suitable for either AM modulation or FM modulation. The modulated signal is directed to a BPF and power amp before being directed to the transmit antenna, as shown in FIG. 1A.

Figure 1B:
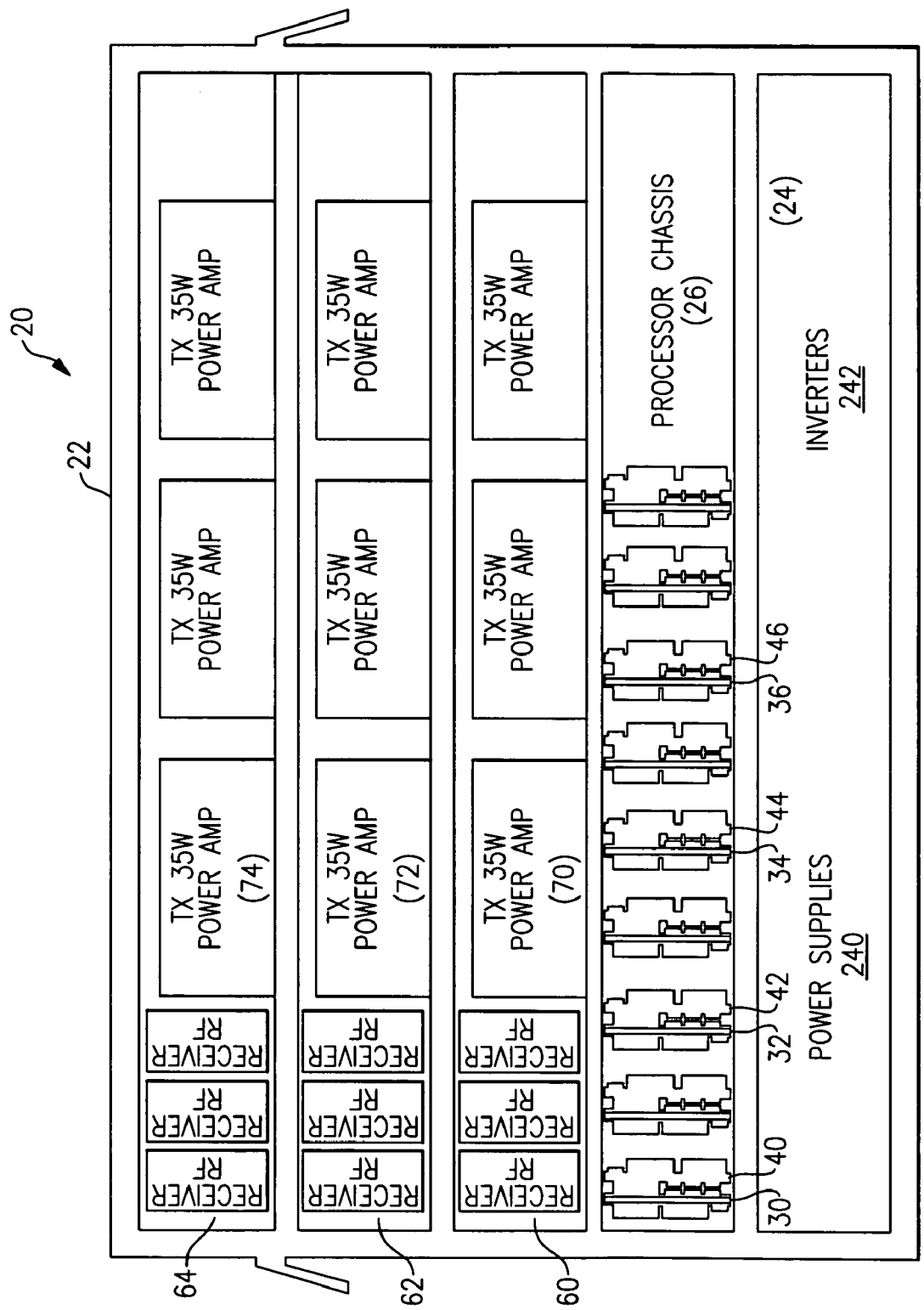
FIG. 1B is a diagrammatic depiction of a mechanical layout in accordance with another embodiment of the present invention.

FIG. 1B is a diagrammatic depiction of a mechanical layout in accordance with another embodiment of the present invention. In one embodiment, Programmable radio unit 20 may be disposed in a 19 inch portable rack 22. Rack 22 includes a processor chassis 26 that includes a backplane that accommodates high speed digital highway 50. DSP cards (30-36) are inserted into connectors coupled to the backplane. The daughter cards are mounted on the corresponding DSP card using a predetermined pin-out arrangement. The daughter cards also accommodate the IF interface and/or baseband interface between the receiver and transmitter facilities. Compartment 24 accommodates the unit's power supplies 240 and inverters. With regard to the power supplies, unit 20 may be directly coupled to 120 VAC by way of a power cord (not shown). Alternatively, power supplies 240 may convert 12V DC from an array of batteries, not shown), to the appropriate voltages as required by unit 20. Rack 22 also includes three racks that accommodate receivers 60-64 and transmitters 70-74. Each frequency band (i.e., 150 MHz, 450 MHz, or 800 MHz) requires one input connector from the receive antenna, which accommodates the entire band, and possibly multiple output connectors, one output connector for each transmitter antenna. Referring to FIG. 1A, for example, the 800 MHz band employs three transmitter antennas.

Figure 2A:
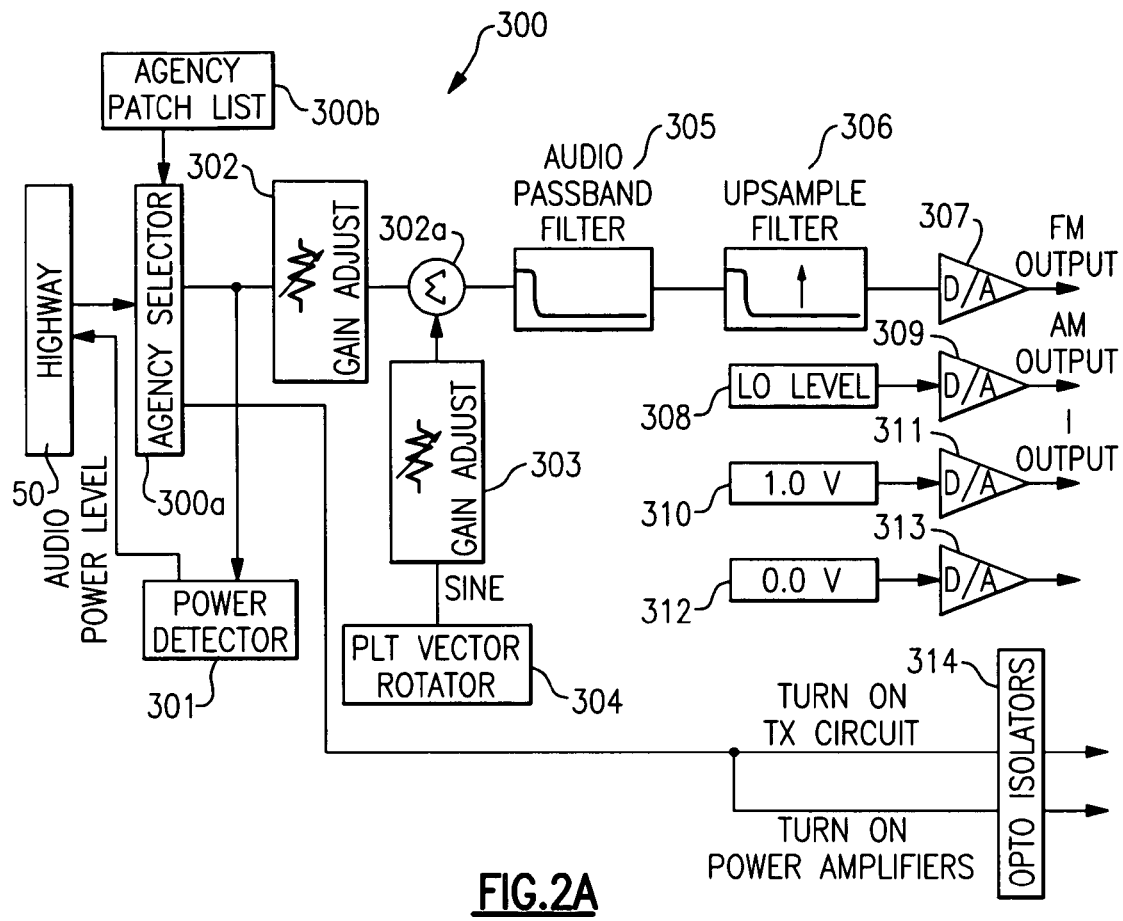
FIG. 2A is a diagram showing the DSP software used to implement an FM transmitter on the software adaptive radio card.
Figure 2B:
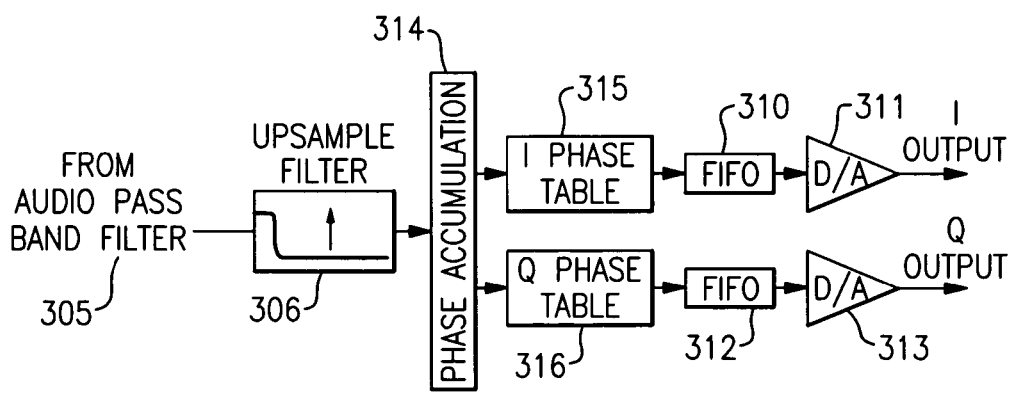
FIG. 2B is a diagram showing the DSP transmitter portion of the software adaptive radio card configured for arbitrary waveform generation using a quaderature carrier modulator.
Figure 3:
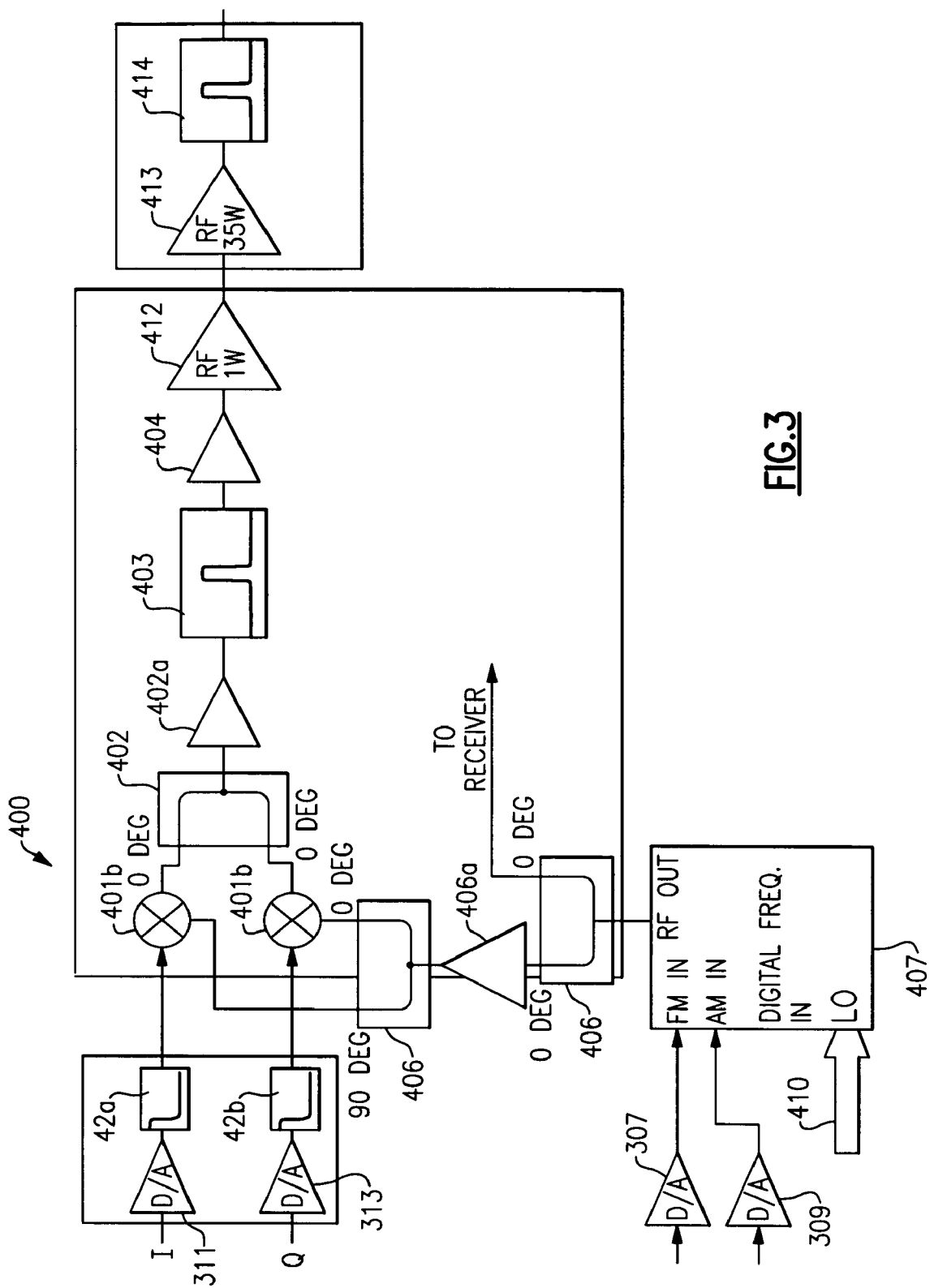
FIG. 3 is a diagram showing the analog RF transmitter portion of the daughter card.
Figure 4:
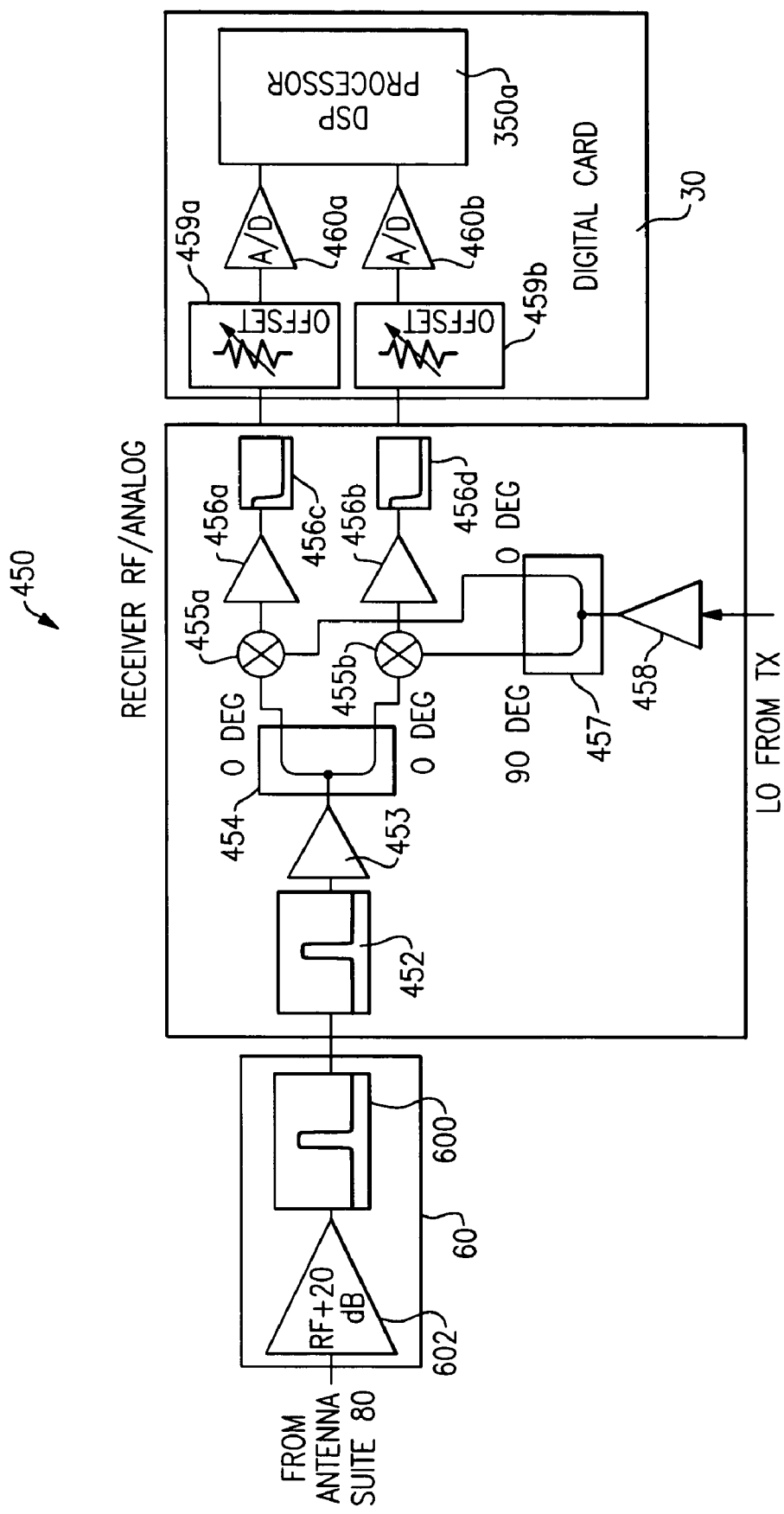
FIG. 4 is a diagram showing the analog RF receiver portion of the daughter card.
Figure 5:
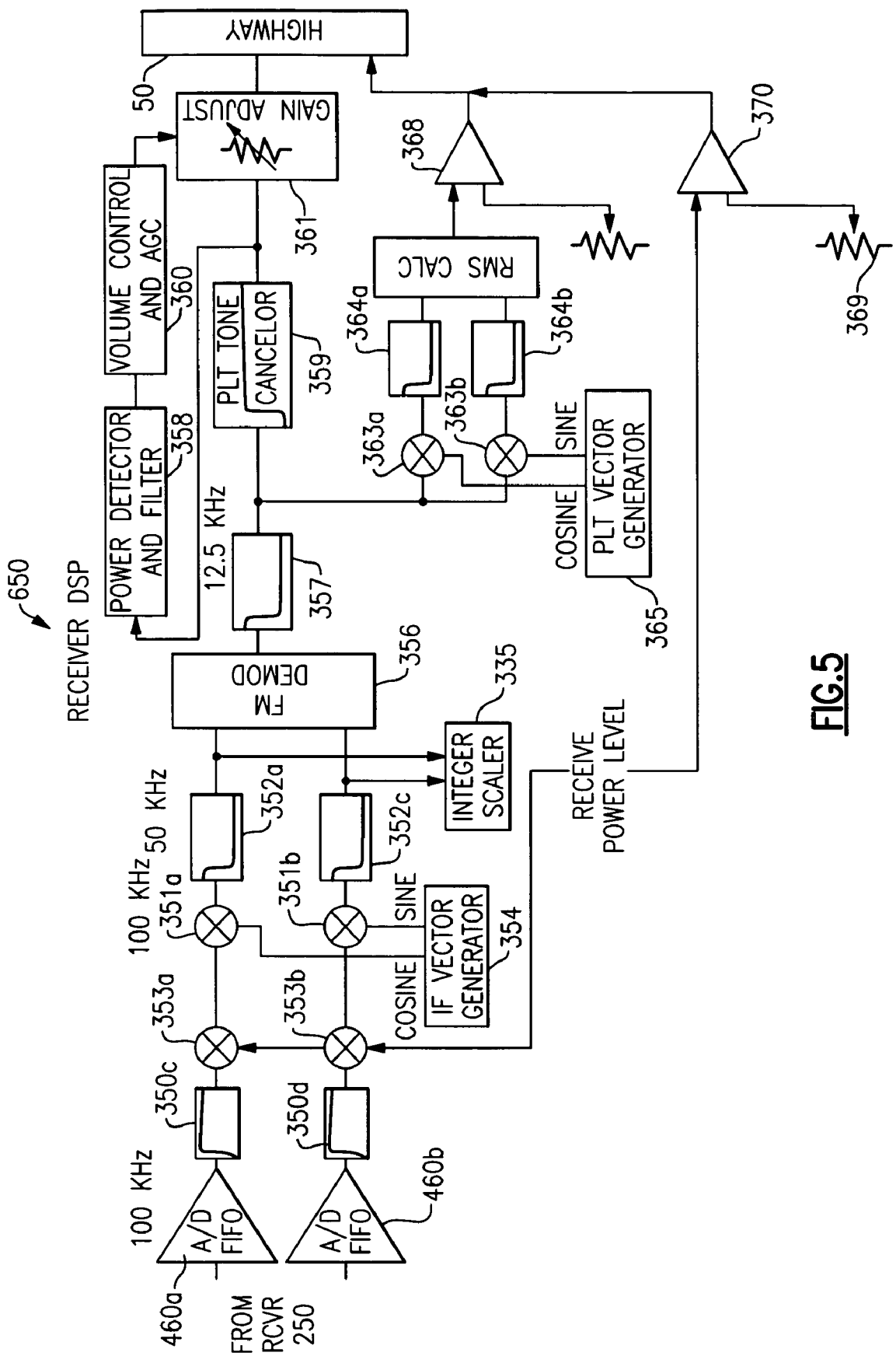
FIG. 5 is a diagram showing a software FM receiver implemented on a DSP card.

The transmit portion of a DSP card is shown in FIG. 2A and FIG. 2B. The RF transmitter is depicted in FIG. 3. Accordingly, the transmit portion of a software defined radio is disclosed in FIG. 2A, FIG. 2B, FIG. 3, and the related text. FIG. 4 is a diagram showing the RF receiver portion of the daughter card. FIG. 5 is a diagram showing the receiver portion of a DSP card.

FIG. 2A is a diagram showing the DSP FM transmitter portion 300 of the DSP radio card 30 depicted in FIG. 1. This is only one of the possible modulations capable of being implemented on the invention, and is shown as a reference as to how transmitters are implemented. Other modulations possible include but are not limited to AM, SSB, QPSK, CPFSK, and others. Digital data corresponding to audio is provided to the DSP transmitter 300 by digital highway 50. Digital audio data is transmitted and received by each software defined radio card 30 by way of digital highway 50. The agency selector 300a monitors all the agencies assigned to this unit to patch from its agency patch list 300b. The high speed buss is abstracted from the software and appears as a shared memory on each of the processors. The software has defined a communications structure for a radio channel. An array of these are located in the shared memory. Each card has an index into this array. Thus, agency selector 300a reads the digital audio data corresponding to the RAM 30 addresses provided by patch list 300b. The priority of the agency's patching is determined by its order in the list. The first agency in the list that has its private line tone (PLT) bit set is read. The digital audio data is read, processed and transmitted by the transmitter portion 300. When the agency selector 300a reads the PLT bit, the "turn on Tx circuit" line is enabled, and the RF transmitter power amp (See FIG. 3) is energized, as well as the transmitter section of the RF translator. The proper power amp and transmitter are selected by enabling the corresponding opto-isolators 314. Opto-isolators are enabled based on the mask setting programmed into the radio from the host graphical user interface (GUI) 900.

Power detector 301 reads a digital value corresponding to the power level of the selected digital audio data. The gain is adjusted in software by gain adjustment module 302, which multiplies the digital audio value by a predetermined amount. Gain adjustment module 302 also sets the proper FM deviation for the output signal. A digital word corresponding to the agency's proper private line tone (PLT) is generated in lookup table (LUT) 304 and scaled to the proper level for the agency by gain adjustment module 303. As those of ordinary skill in the art will appreciate, PLT allows frequency sharing by more than one agency.

While an agency may share the same carrier frequency with a second agency, each agency has a separate sub-audible tone, commonly referred to its PLT. PLT may also be referred to as the Continuous Tone Controlled Signaling System (CTCSS) or as the Continuous Tone Controlled Squelch System. Accordingly, each agency only hears the FM transmission associated with their PLT signal. For example, a fire department in one town may share the same carrier frequency as a fire department in an adjacent town. Both departments are in the reception range of the other. Confusion is avoided by assigning each department its own unique PLT.

Referring back to FIG. 2A, gain adjustment module 303 is also implemented in software by using a multiplier module. Those skilled in the art will recognize that the audio signal gain and the PLT gain must be balanced relative to the other. Subsequently, the digital audio signal and the PLT are superimposed by adder 302a. The composite digital audio/PLT value is directed into audio band pass filter (BPF) 305. The pass band of BPF 305 is programmed to correspond to the audio bandwidth of the agency radio. The digital audio values are directed into up-sample filter 306. As those of ordinary skill in the art will recognize, an up-sample filter increases the number of audio samples in the digital output stream. This may be implemented by interpolation. The up-sampled digital audio is subsequently directed into digital to analog converter (DAC) 307. For example, in the direct FM embodiment, the output of DAC 307 is a modulating signal: $x_M(t)=\beta \sin(\overline{\omega}_m t)$, $\omega_m$ is the modulation frequency, t is time, and $\beta$ is the modulation index. As those of ordinary skill in the art will understand, the modulating signal is multiplied with a sinusoidal carrier wave in the FM transmitter. Those skilled in the art will understand that the AM modulating signal and the IQ signals are generated in accordance with the modulation employed by the RF transceiver.

FIG. 2B is a detail view of the DSP transmitter 300 configured to support arbitrary waveform modulation types such as but not limited to AM, SSB, QPSK, CPFSK, QAM16. A quadrature carrier modulator is incorporated to allow for this. In the case of an FM transmitter (shown), the DSP transmitter portion (in FIG. 2B) from up-sample filter 306 back to the digital highway 50 is identical to the portion shown in FIG. 2A. However, the output of up-sample filter 306 is directed into phase accumulator 314. The up-sample filter 306 provides the various points in the waveform in digital form. As those of ordinary skill in the art will appreciate, the waveform is a sinusoidal function having a phase that advances linearly through a sine wave in both the positive and negative directions. The rate at which the phase advance is proportional to the instantaneous amplitude of the modulating signal. The digital number representing the phase is provided by the phase accumulator 314. As the phase advances, the number is increased at regular intervals. Accordingly, phase accumulator 314 may be implemented by the DSP as a counter. Thus, amplitude and phase data are directed into in-phase (I) look-up table (LUT) 315 and quaderature phase (Q) look-up table (LUT) 316. (I)-LUT 315 provides the sine value of the digital waveform, and (Q)-LUT 316 provides the cosine value of the digital waveform. The sine value is stored in a first-in/first-out (FIFO) buffer 310, and the corresponding cosine value is stored in FIFO 312. Accordingly, each sine/cosine pair of values are sequenced through the FIFO buffers, and at the appropriate time directed into DAC 311 and DAC 313, respectively.

Referring to FIG. 3, the RF transmitter 400 of RF transceiver suite 40 (FIG. 1) provides for three types of modulation techniques: quaderature carrier modulation (IQ), direct FM modulation, and direct AM modulation. FIG. 2A showed the DSP portion of the FM transmission path. As noted above in the discussion of FIG. 2A, an FM modulator is relatively simple, performing a product modulation of a modulating signal and a carrier wave. As shown in FIG. 3, the carrier wave is provided by local oscillator 407. As noted above, the FM modulating signal is provided to the direct FM modulator by way of DAC 307. The AM modulating signal is provided by way of DAC 309. The local oscillator 407 is shared by the AM modulator and direct FM modulator. The frequency is selected via digital input selector 410. As those of ordinary skill in the art will appreciate, any suitable commercial signal generator may be employed, such as one manufactured by Ramsey Electronics. However, the invention should not be construed as being limited to this device. For example, the invention may also use a custom local oscillator. The AM input is used to adjust the power output of the converter over a 40 dB range. The AM input is always used to scale the output of the system for maximum IQ dynamic range and to provide the best level to drive the receive and transmit mixers.

Those of ordinary skill in the art will understand that AM modulation is defined as a process whereby a carrier wave is varied about a mean value, linearly with a baseband signal m(t). Further, AM modulation may be implemented, for example, by a square law modulator, or by some other suitable means. Those of ordinary skill in the art will also recognize that the present invention may employ double-sideband suppressed carrier (DSBSC) modulation, as well full AM modulation. Because the present invention supports quadrature carrier multiplexing, those of ordinary skill in the art will further recognize that the present invention may be configured to support quadrature FM, single sideband (SSB), or vestigial sideband (VSB) linear modulation techniques. Those of ordinary skill in the art will also recognize that the quadrature carrier system also supports digital signaling systems such as continuous phase frequency shift keying (CPFSK).

Referring back to FIG. 3, a diagram showing the quaderature carrier RF transmitter portion of the RF transceiver suite is shown. As noted in the discussion of FIG. 2B, I-channel data and Q-channel data are converted into analog signals by DAC 311 and DAC 313 respectively. The analog signals are directed into anti-aliasing filters (42a, 42b). The anti-aliasing filters are configured to attenuate the analog signal in portions of the frequency spectrum where no signal should be present. In this case, the anti-alias filter attenuate some of the broad band noise generated by the DACs. At this point, the filtered I-channel signal and the filtered Q-channel signal are directed into mixer 401a and mixer 401b, respectively. The mixers may be thought of as product modulators. The I-channel signal is multiplied by a carrier wave that is 90° out of phase with respect to the Q-channel signal.

The output of the local oscillator 407 is divided by a 0° divider 406. Accordingly, both outputs are in-phase on with the other. One output is used by RF transmitter 400, and the other is employed by RF receiver 450 (FIG. 4). An attenuator-amplifier combination 406a scales the local oscillator power and isolates the transmit oscillator from the receiver oscillator signal. The transmit carrier signal is directed into a 90° splitter. One out put of the splitter provides mixer 401a with a carrier signal whereas the other output provides mixer 401b with a carrier signal 90° out of phase with the other. The mixer outputs are directed into power combiner 402. Power combiner 402 sums the two signals to form a multiplexed signal. The multiplexed signal is amplified by amplifier 302a. The amplified signal is then directed into bandpass filter 403. Bandpass filter 403 selects a band of frequencies that corresponds to the corresponding agency passband. Filter 403 also minimizes any output spurious responses. Amplifiers 404, 412 act in concert to boost the signal to 1 watt. A power amplifier 313 then takes it to 35 watts. Optional output filter 314 may be used to further reduce spurious responses. Subsequently, the modulated RF signal is directed to an appropriate antenna in antenna suite 80 (See FIG. 1).

Referring back to FIG. 1, each DSP radio card 60 includes a receiver portion coupled to an RF receiver disposed in RF transceiver suite 40. A signal from one of the agency radios is directed into the RF receiver by an antenna disposed in antenna suite 80. The RF receiver provides card 60 with an demodulated analog signal. The DSP receiver portion converts the analog signal into a digital audio signal. As will be described below, the processed audio data is patched to another DSP card 60 by way of digital highway 50. The RF receiver 450 is shown in FIG. 4. The receive portion 650 of DSP radio card 60 is depicted in FIG. 5. Accordingly, the receiver portion of a software defined radio 10 is shown in FIG. 4 and FIG. 5, and the associated text.

As embodied herein and depicted in FIG. 4, a diagram showing the RF receiver portion 450 of the RF transceiver suite 40 (See FIG. 1A) is disclosed. The RF signal received by the software radio's antenna 80 typically passes through pre-amplifier 45, which comprises amplifier 450 and band select filter 451. The pre-amplifier 45 input filter 451 limits the input of the receiver to the frequencies/bands in which the software radio is intended to operate. In a heavy patching environment filter 451 may prevent receiver saturation caused by unwanted signal sources, such as broadcast stations.

After pre-amplification, the signal is sent to RF receiver 450, wherein the signal is demodulated into an intermediate frequency (IF) compatible with the software radio's analog-to-digital (A/D) converters. Receiver 450 includes bandpass filter 452. Filter 452 is configured to further limit out of band signals. The filtered signal is subsequently directed into amplifier 453 to overcome the conversion loss of the mixers 455*a*, 455-*b*, the insertion loss of the splitter 454 and the noise introduced by IF amplifiers 456-*a*, 456-*b*. After amplification, the RF signal is divided by 3 dB splitter 454. Both RF outputs are in phase with other output. One RF output is directed to mixer 455*a*, whereas the other is directed into mixer 455*b*. The local oscillator signal 407 (FIG. 3) is divided by splitter 457. Splitter 457 provides one out put in-phase with the local oscillator and a second out put that is 90° out of phase with the local oscillator. In other words, if the local oscillator signal is characterized by a sine function, the second output would be characterized by the cosine function. Mixer 455*a* multiplies the RF signal by the local oscillator and outputs, among other things, a demodulated I-channel signal at an intermediate frequency. Mixer 455*b* multiplies the RF signal by the out of phase oscillator signal, and outputs a demodulated Q-channel signal at the intermediate frequency. The I-channel IF signal is directed into IF amplifier 456*a* and the Q-channel IF signal is directed into IF amplifier 456*b*.

Subsequently, the amplified signals are directed in low pass filter 456*c* and 456*d*, respectively. Filters 456*c*, 456*d* also provide anti-aliasing of the resulting signals. The low pass filters typically output the I-channel signal and a Q-channel signal at a low IF frequency. It may not be desirable not to operate at baseband as semiconductors produce excessive noise around DC. In addition, many other noise sources tend to come in at near DC; hence the use of an IF. On the other hand, in another embodiment, these filters may output the I-channel and the Q-channel at baseband. There are some cases, for example in auto acquire, in which operation at a zero IF (baseband) is desirable. The system may operate at baseband or IF without any controls. The IF frequency can be chosen to minimize image leakage, by placing the image at a quiet spot in the spectrum. When used to auto acquire an unknown signal, the signal level is high enough [60 to 80 dB signal-to-noise ratio (SNR)] to overcome any low frequency noise sources.

After filtering, the I-channel and the Q-channel are directed into DSP radio card 60 for further processing. As shown in FIG. 4, DSP card 60 includes DC offset components 459*a*, and 459*b*. These components remove any DC bias present in the I-channel and the Q-channel. Finally, both the I-channel and the Q-channel are directed into A/D converter 460*a* and A/D converter 460*b*, respectively. Accordingly, digital I-channel signals and digital Q-channel signals are directed into DSP receiver portion 650 for further receive side processing and radio emulation.

FIG. 5 is a diagram showing an FM DSP receiver portion 350 of the software adaptive radio card depicted in FIG. 1. The invention is not limited to FM, but as in the case of the aforementioned transmitter may be an AM, SSB, CPFSK, QAM or other format receiver. As noted above DSP receiver 350 receives digital data via A/D converters 460*a* and 460*b*. Each converter typically includes a first-in-first-out (FIFO) buffer. In one embodiment, 24-bit data samples are written into the FIFO buffers. Accordingly, the I and Q data sample pairs are synchronously read out from the FIFO buffers by a clock (not shown) signal provided by card 30. Subsequently, the I-channel sample and the Q-channel sample may be directed into high-pass filters 350*c* and 350*d*, respectively. Integer scaler module 355 provides an integer value that is directed to multipliers 353*a* and 353*b*. The I-channel sample and the scaler integer are multiplied by module 353*a*, whereas the Q-channel sample and the scaler integer are multiplied by module 353*b*. The 24 bit A/D samples are scaled in the manner described to maximize dynamic range.

IF vector generator 354 provides digital down converter 351*a* with a digital cosine value, and also provides digital down converter 351*b* with a corresponding sine value. Thus converter 351*a* "downconverts" the I-channel digital sample by multiplying it with the sine value to obtain an intermediate frequency data sample. In similar fashion, converter 351*b* downconverts the Q-channel sample by multiplying it with the sine value. The I-channel IF data sample and the Q-channel IF data sample are directed into digital filters 352*a* and 352*b*, respectively. Filter 352*a* and filter 352*b* are programmed in software to match the agency's FM deviation. As those skilled in the art recognize, each FM transmitter is characterized by a maximum carrier frequency deviation. The filtered signals are directed into FM demodulation module 356.

Any suitable FM demodulation technique may be employed in the present invention. The DSP of the present invention may emulate FM circuits such as slope detectors, ratio-detectors, Foster-Seeley discriminators, phase-locked loop (PLL) demodulators, or quadrature detectors. In the embodiment depicted in FIG. 5, a phase discriminator 356 is employed to recover the digital audio samples.

The digital audio samples are filtered by bandpass filter module 357 to optimally match the agency's audio bandwidth. As those of ordinary skill in the art will appreciate, any private line tone (PLT) that is present should not be directed to other radios. To remove the PLT that may be present, the audio is passed through a PLT cancellation module 359, which filters out the PLT. After the PLT is removed, audio power is detected in the power detector 358. If the AGC module 360 is enabled, a gain control register in module 360 is set. Otherwise, an operator stationed at host computer 90 sets the register using the graphical user interface (GUI). Accordingly, the software radios of the present invention may employ either manual gain control and/or automatic gain control (AGC) modes of operation. In either case, the digital audio is scaled by gain adjust module 361. The digital value output by module 361 corresponds to a signal having an appropriate amplitude. The digital audio sample is directed onto the high speed highway 50 and stored in RAM 30 where it may be accessed by other cards 30 in accordance with its agency patch list 300*b* (See FIG. 2A).

As noted above, many FM systems use a PLT for identifying the "talk group" and to break squelch. The present invention detects the PLT in software by heterodyning the audio with the appropriate PLT frequency. Referring back to FIG. 5, the digital audio signal is directed from filter 357 to product multiplier 363*a* and product multiplier 363*b*. PLT vector generator 365 provides multiplier 363*a* with a cosine value that corresponds to the PLT frequency. If PLT is present, the tone will be converted into a DC value. The resulting translated tones are subsequently filtered by narrowband filter (0.1 Hz) 114-*a*, and narrowband filter 114-*b*, respectively. The two signals are directed into root-mean-square (RMS) module 366. The RMS calculation result is directed to comparator 368. Comparator 368 compares the RMS result to the value established by threshold value 367.

If the RMS value exceeds the threshold, a PLT detected bit is set in a highway buffer 50. The PLT threshold and frequency are provided by the operator via the GUI. These values may also be stored in the agency data base.

When no squelch is present, the RF power level in the channel is used to trigger the presence of a signal. The RF level is directed into comparator 370 and compared to reference level 369. Comparator 370 is used to reset the PLT-detected bit in highway buffer 50. The reference level may be provided via the GUI. The reference level may be stored in the agency data base as one of the agency parameters.

In the example of FIG. 5, a quadrature frequency modulation receiver is implemented in the software radio card 30. However, as noted above, the scope of the present invention is not limited to quadrature FM software radios. Both the transmit side and receive side of the software defined radio may be implemented using amplitude modulation (AM), single sideband modulation (SSB), as well as digital formats including continuous phase frequency shift keying (CPFSK), bi-phase shift keying (BPSK), offset quadrature phase shift keying (OQPSK), quadrature amplitude modulation (QAM) as well as other modulation formats. Accordingly, the present invention may include a plurality of software radios. According to the present invention, the software radio is a specific class of software-definable radio such that all aspects of the radio are defined in software. FIG. 3 depicts a direct conversion radio. The software radios of adaptive radio interface 100 are not limited to direct conversion radios, but may alternately include multiple conversion radios. What distinguishes the software radio of the present invention is that the signal path from the digital signal processor (DSP) to the antenna is linear, allowing any variety of waveform to be used. If non-linear components are used, the choice of waveforms is limited to a constant amplitude sub-class of waveforms (FM, CPFSK etc.), thereby eliminating SSB, AM, QAM16 etc. A non-linear path also limits the bandpass shaping possible with the use of a linear channel as this invention uses.

In the discussion provided relative to FIGS. 2-5, the software radio transmit and receive functionality was described. In the description audio data is provided to the transmitter by highway 50, and received audio is provided to highway 50. As shown in FIG. 1A, highway 50 is coupled to dual port RAM 30. Dual port RAM 30 is employed as the means of implementing the highway to facilitate the abstract transferring the audio between radios.

Figure 6:
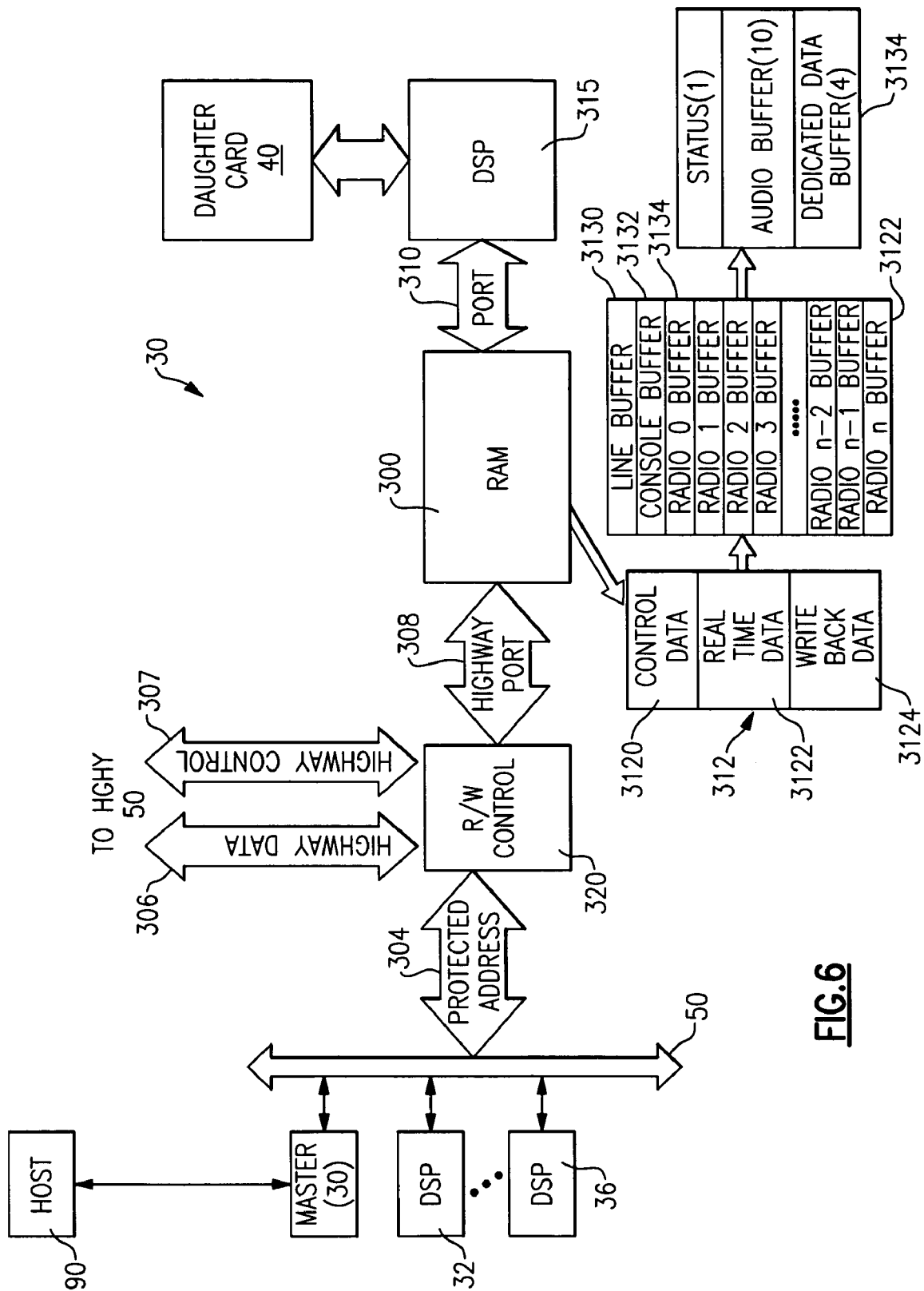
FIG. 6 is a block diagram of the inter-radio card communications highway including a memory map of a shared memory space.

FIG. 6 is a block diagram of the inter-radio card communications highway including a memory map of a shared memory space. The read/write (R/W) controller 320 controls the addressing, control, and data lines comprising digital highway 50. DSP card 30 also includes a dual ported RAM module 300. One port 310 is connected to the DSP 315, whereas the second port 308 is connected to digital highway 50. The second port 308 is connected to R/W control hardware 32 which refreshes the RAM 300 with data from DSP 315 and the corresponding daughter card 40. Accordingly, R/W control 320, which may be implemented using high speed FPGA technology, may perform high speed real-time digital audio exchanges with buss 50 while DSP 315 performs its processing simultaneously. Highway control signals 307 synchronize the addressing of RAM 300 in order to avoid conflicts between the various devices coupled to highway 50. DSP 315 has a protected range of addresses which controller 320 may not write to. These addresses are reserved for DSP 315 control data. The data the DSP writes into these locations may be viewed by the other processors.

Digital highway data lines 306 may be implemented using a high speed serial (1 bit) interface or a parallel interface. According to the various embodiments, the parallel interface may include 8, 16, 32, or 64 bit busses. However, those of ordinary skill in the art will recognize that other interfaces may be implemented. As a result of highway 50, DSP overhead is not incurred in the routing of data between DSP cards. The software radio shared memory processes are performed in a manner that is relatively transparent to DSP 315.

Highway 50 is configured to update a shared memory space in RAM 300 for all radio cards in the system. DSP 315 may view audio from all of the other DSP cards in system 10. The present invention provides for up to, but not limited to, 27 logical devices, radios, consoles, lines, etc. Cards plugged into the highway are identified by the host and added to its list of resources. Upon system "boot-up," each card reports to the host and identifies the relevant software radio parameters, i.e., frequency range, power levels, and bandwidth based on the coupled daughter card.

Referring back to FIG. 6, a detail view of a memory map 312 of RAM 300 is shown. Each device is assigned a memory buffer in RAM 300. Accordingly, communication between devices, and between DSP cards 430-36 is implemented by reading/writing from/to the address of the appropriate memory buffer in the shared memory. All cards see the data written by other processors via digital highway 50. Upon power up, DSP 315 queries daughter card 40 to determine which RF frequency band card 40 will accommodate. DSP 315 writes this information into write back data location 3124. DSP 315 may provide other bits of status information. Subsequently, host 90 will provide the card with configuration data via master card 30. The configuration data is stored in control data location 3120. DSP 315 uses this information to dynamically reconfigure itself as a software radio programmed to emulate an external agency radio. Once operational, digital audio is exchanged between DSP cards 30-36 and highway 50 by way of real-time data segment 3122. This segment includes an audio buffer 3134 for each DSP card in the system. Each radio buffer 3134 is divided into three segments. The first segment is one word dedicated to device status. The second segment includes ten words of audio samples. The third segment includes four words of real time data. This buffer is refreshed at a rate of 1.2 kHz. In this embodiment, the system audio sample rate is limited to 12 kHz. However, because the rates and memory configuration is programmable, the present invention is not limited to these rates or configurations.

The software architecture includes a GUI and radio programs that are typically stored in host 90. The software includes radio database, an auto acquisition routine, and a software radio patching matrix. A patching graphical user interface (GUI) is associated with host 90. The GUI accesses radio database for agency radio data and uses this information to program Radio cards to implement the required radios. The radios are programmed by way of master DSP card 40. The software radio functionality is totally performed on each card including the radio patching functions. The host 90 provides visibility of what is happening to the operator and allows the operator to change the programming of the radio cards, master DSP card 30, and radio DSP cards 32-36 operate autonomously. Software radio patching is discussed relative to FIG. 8. The radio auto acquisition process is discussed relative to FIGS. 9-11. Master DSP card 30 is discussed relative to FIGS. 12-15. The receiver and the transmitter portions of radio DSP cards 32-36 were discussed above.

The auto-acquisition software provides the means for identifying an unknown radio. The auto-acquisition routine, along with associated hardware, is configured to receive a signal from an unknown agency radio, and provide the corresponding signal data to auto acquire software. The auto acquisition software analyzes the signal, measures the emissions of the unknown agency radio, and determines the parameters (modulation format, carrier frequency, etc.) required to communicate with the unknown agency radio. The auto acquisition software is also programmed to enter the acquired parameters of the unknown agency radio into software database.

The patching GUI also provides a user with an input mechanism, such as a mouse, cursor control, and/or keyboard, that allows a command and control operator (not shown) to define patches between agencies. When multiple agencies are involved, the operator may form a talk group. The GUI also allows the operator to assign priorities to each of the patches.

Figure 7:
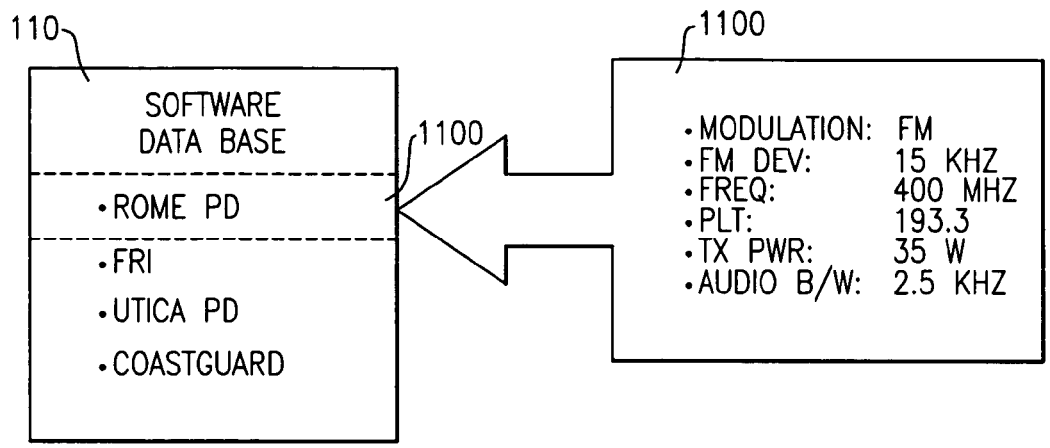
FIG. 7 is a detail diagram of the software database in accordance with the present invention.

FIG. 7 is a detailed diagram of the software database described above. Software database 110 contains the electronic description of the communications parameters associated with each agency radio in database 110. Software database 110 includes records 1100 associated with any number of agencies. Each record includes fields containing parameters required to emulate an agency's communications equipment. For example, an agency record 1100 may typically include the radio modulation format, carrier frequency, talk group codes and/or PLT, transmitter power, audio bandwidth, and any additional parameters required to define a connection with any particular agency radio. The signal parameters are in units that would be familiar to an RF technician. The signal parameters 155 contained in software database 150 must at a minimum include parameters sufficient to allow a software radio to emulate signals received and transmitted by an agency radio.

Software database 110 is coupled to the GUI associated with host 90. Accordingly, the operator may access and/or search signal parameters by agency name and/or agency identifier. Database 110 allows an operator to easily configure a software radio to communicate with an agency's communication equipment. Agencies may be listed in software database 110 in any order. Further, the operator may command database 110 to assign particular agencies to a group, based on the tactical/operational situation at that moment in time. When the crisis has been resolved, the operator may then disband the group accordingly. As noted above, the GUI provides the operator with an input mechanism (keyboard, mouse, etc.) and output (display, printer) devices for viewing or modifying an agency's signal parameters. Further, the operator may reprogram a software radio DSP card 60 to emulate any agency's communications equipment by changing the signal parameters to correspond to that agency's communications equipment.

Reprogramming may be done instantaneously by writing new signal parameters in software database 110. Of course, the parameters are subsequently provided to the radio DSP card assigned to emulate that particular agency. The GUI also allows an operator to copy a radio template from the database or selected signal parameters from one agency's record into another agency's record. For example, as noted above, one local police department may share the same communications format (i.e., FM modulation, carrier frequency, FM deviation, etc.) with a police department in an adjacent town, with only differing parameter being their respective private line tones (PLT). The operator would efficiently use the GUI to copy the entire agency template or certain relevant fields into the second agency's record. Only the new agency's name and PLT would have to be added to database 110. Further, the signal parameters in a record may be formatted in such a way that they may easily be exported to a spreadsheet or text editor. Accordingly, database 110 is relatively easy to maintain. Signal parameters may be sorted and distributed in software database 110 as needed.

The present invention may be employed to form talk groups that connect two or more agencies using dissimilar communications equipment. Talk groups are formed by configuring two or more software radios to emulate the communications signals of two or more agencies. Each software radio includes the programmable transmitter portion of a radio DSP card, the corresponding RF transmitter, antenna, the RF receiver, and the receiver portion of the DSP card 60. Thus, the software radio is described above in the text associated with FIGS. 2-5. Accordingly, an RF signal transmitted by a first agency may be received by a first software radio, conveyed to a second software radio by digital highway 50. The second software radio retransmits the message to the second agency using the second agency's communications parameters stored in the database. In similar fashion, an RF signal from the second agency is received by the second software radio, conveyed to the first software radio via digital highway 50, and retransmitted by the first software radio to the first agency. Additional agencies can be included in the same talk group by providing additional software radios to receive and transmit signals according to parameter information stored in software database 110.

When one agency in the talk group transmits, the transmitted signal is demodulated, converted into digital audio, and transmitted by a software radio to other agencies in the talk group. Multiple talk groups can be active at the same time. Transmissions in one talk group have no effect on the others. The GUI may be configured to display status and signal strengths of the agency radios in each group. The status may show which radios are transmitting and which radios are receiving. The GUI may also be configured to indicate when a patch is being established.

An agency may be a member of more than one talk group. By default, when a software radio of a multiple-group agency transmits, all radios assigned to patch that agency see the valid data and ensure that the signal is transmitted to the agency assigned to it. Similarly, the agency will receive the signals transmitted by each agency in each talk group in which the agency is a member. The operator may modify the default control so that an agency's membership in a given talk group is either listen only or talk only, rather than listen and talk. As discussed elsewhere in this description of the invention, the operator can assign priorities. In one embodiment, The GUI allows the operator to control an agency's talk group membership and priority by using point and click functionality.

Figure 8:
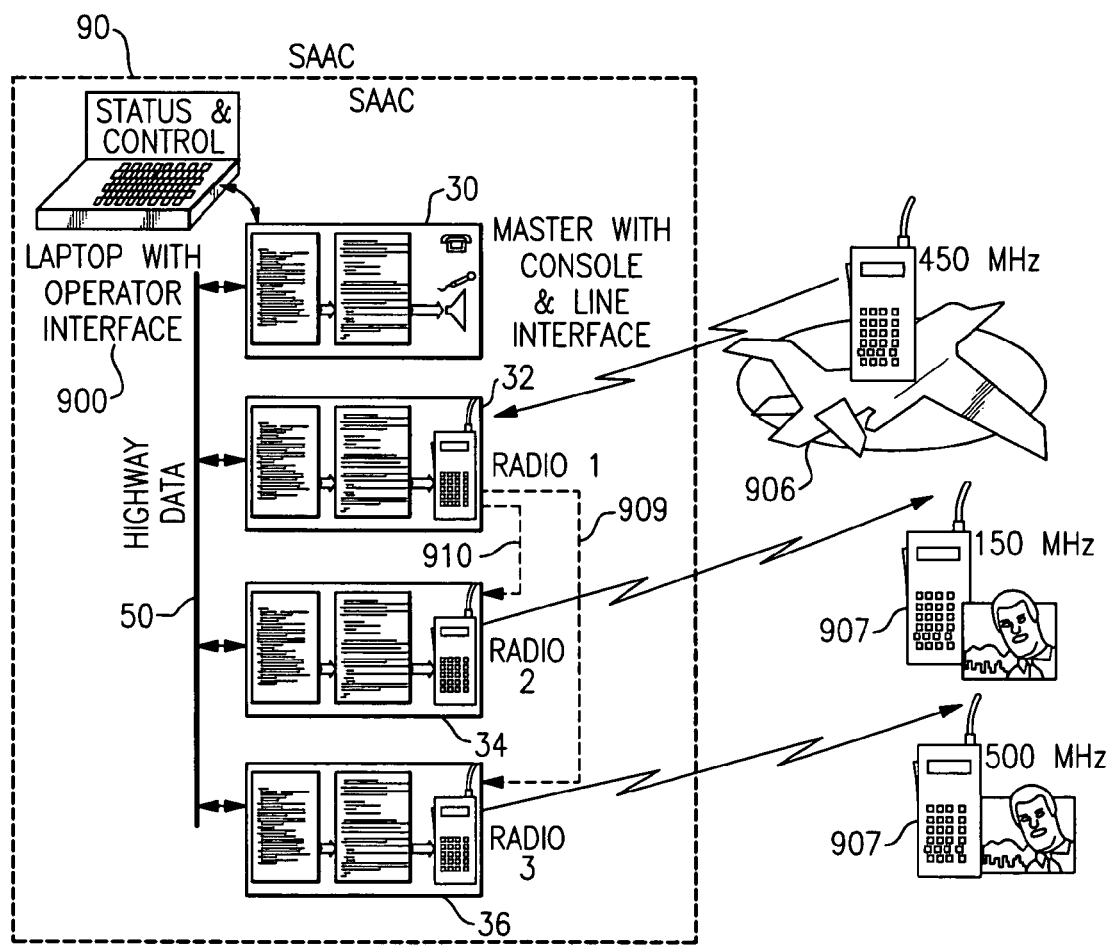
FIG. 8 shows a method of operating the present invention in accordance with an embodiment of the present invention.

FIG. 8 shows a method of operating the present invention in accordance with an embodiment of the present invention. As an example, FIG. 8 depicts three agency radios, a first agency radio 906 operating in the 450 MHz band, a second agency radio 908 in the 800 MHz band, and a third agency radio 907 in the 150 MHz band. The agency radios are unable to communicate directly because their frequency bands are incompatible. The present invention solves this problem by translating and patching the dissimilar signals of the different agency radios.

As described above, each software radio 32, 34, and 36 emulates one agency radio type, and is capable of both transmission and reception. Each software radio may receive transmissions from its assigned agency and, via the highway 50 make its audio available to all the other software radios for retransmission. Similarly, each software radio may receive audio from any other software radio and transmit it to its assigned agency. Host computer 90 may be employed to establish and control software radio patching, as described above. Host computer 90 programs the software radios to emulate certain radio types and also programs radio patching assignments.

FIG. 8 depicts first agency radio 906 transmitting a signal. Referring to FIG. 1, the signal is captured by an antenna and converted from an RF signal into an analog signal. The analog signal is directed into the receiver portion of the assigned radio DSP card by an adaptive radio interface. The analog signal is converted into digital audio and written into RAM 30 via digital highway 50. The digital audio is read by second software radio 34, subsequently converted into an RF signal, and retransmitted to second agency radio 907, forming a first virtual connection 910. Simultaneously third software radio 36 takes the audio from the digital highway 50 and transmits it to the third agency radio 908, forming a virtual second virtual connection 909.

Figure 9:
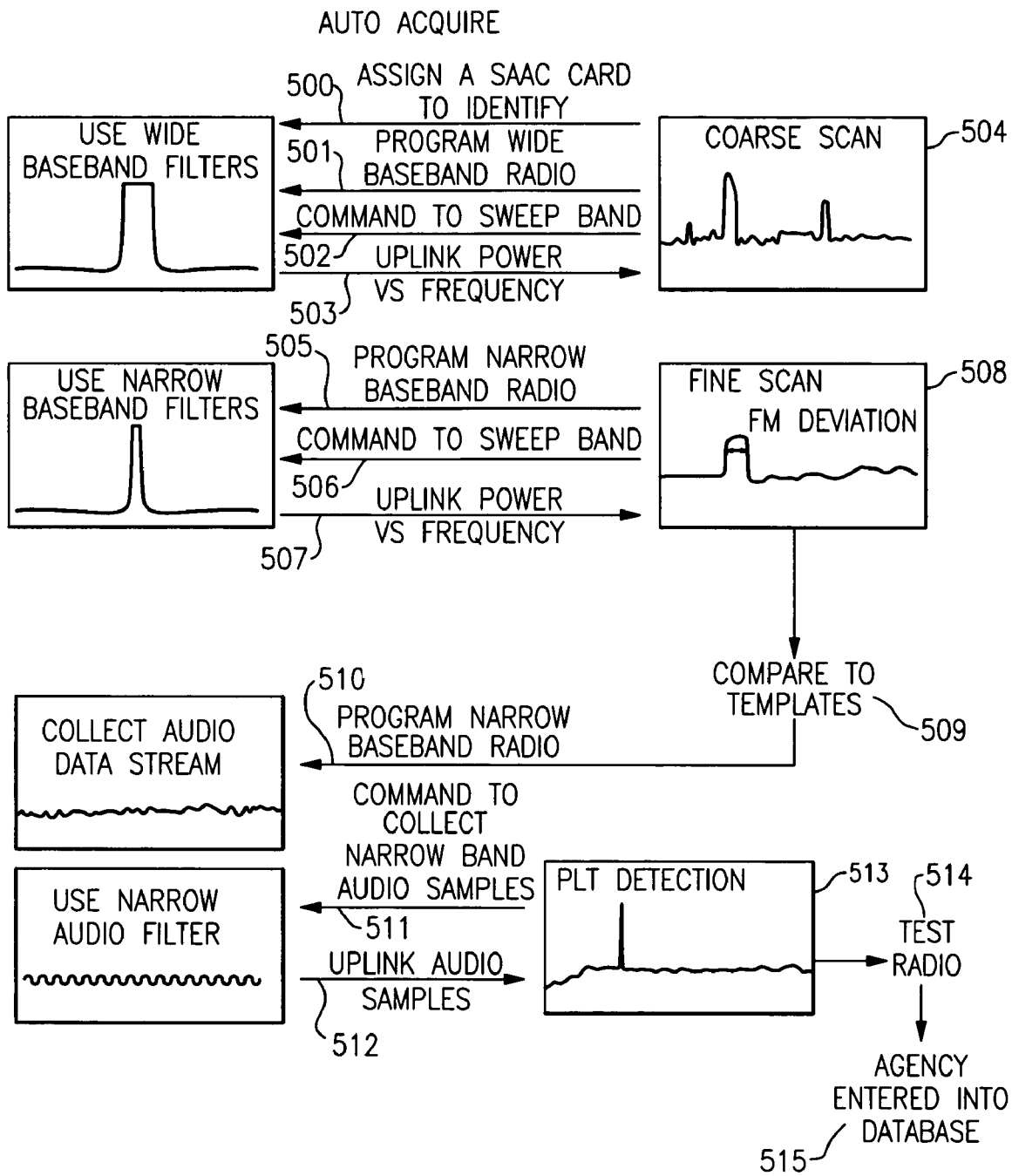
FIG. 9 shows a method of auto-acquiring an unknown radio in accordance with an embodiment of the present invention

FIG. 9 shows a method of auto-acquiring an unknown radio in accordance with an embodiment of the auto acquisition routine depicted in FIG. 7A. The auto acquisition process accommodates agency radios having communications parameters that are not stored in the database 110. The system guides an operator through a series of steps to quantify the radio and retrieve the necessary operating parameters to make the system work with the agency's radio. For conventional radios, the required parameters are frequency, modulation (digital, AM, SSB, or FM), deviation, audio bandwidth, and PLT, if present.

Referring to FIG. 9, the system operator starts the auto acquire process by assigning a radio DSP card 32 in step 500. The radio DSP card 60 is configured to identify the unknown agency radio. In step 501, the assigned radio card 32 is programmed to accommodate broadband radio signals. For example, in one embodiment, the radio card 32 receive filters are programmed to accommodate a 15 KHz bandwidth. However, because the functionality resides in software, wider bandwidths may be employed. In step 502 of the auto acquisition process, radio card 32 commanded to sweep the spectral band and measure power received as a function of frequency. In an alternate embodiment, Fast Fourier transform (FFT) based signal location methods may be used. In step 503, a coarse-scan frequency plot 504 derived from step 502 is provided to host 90. Host 90 uses the plot 504 to compute a selected coarse frequency for the unknown agency. The frequency plot is also displayed for the operator to verify that the automatic frequency selection was correct.

In step 505, the operator reprograms the receiver filters in radio card 32 to convert the receiver portion into a narrowband receiver. In step 506, radio card 32 is directed by the auto acquisition program 120 to sweep a range of frequencies around the course frequency selected in step 504. Received power vs. frequency data is provided to host 90 in step 507. The auto acquisition program 120 uses this data in step 508 to precisely determine the center carrier frequency. The auto acquisition program 120 also determines the signal bandwidth, and FM deviation when FM modulation is employed. In step 509, the measured data is compared with transmitter templates stored in database 110 to determine if the measured data corresponds to an existing transmitter profile.

In step 510, the auto acquisition program 120 determines if a PLT is being transmitted by the unknown agency radio. At this point, radio card 32 is programmed to be a radio that emulates the unknown agency, but it is not programmed to transmit or receive the proper PLT. In step 511, the radio card 32 is programmed to collected narrowband audio samples. The samples are provided to host 90 in step 512. Host 90 performs a Fast Fourier Transform (FFT) analysis using the data samples collected in step 511 to determine if a PLT if present. In step 513, the card 32 is programmed in accordance with the measured parameters. The operator tests the radio card 32 to ensure that it is operable with the unknown agency radio. If radio DSP card 32 fails to perform to satisfaction, the operator may manually adjust any of the parameters using The GUI, and repeat test 514 as needed. When the operator determines that radio card 32 is interoperable with the acquired agency's radio, the agency's communications parameters are then entered into database 110. At this point, the software radio is operable.

Figure 10:
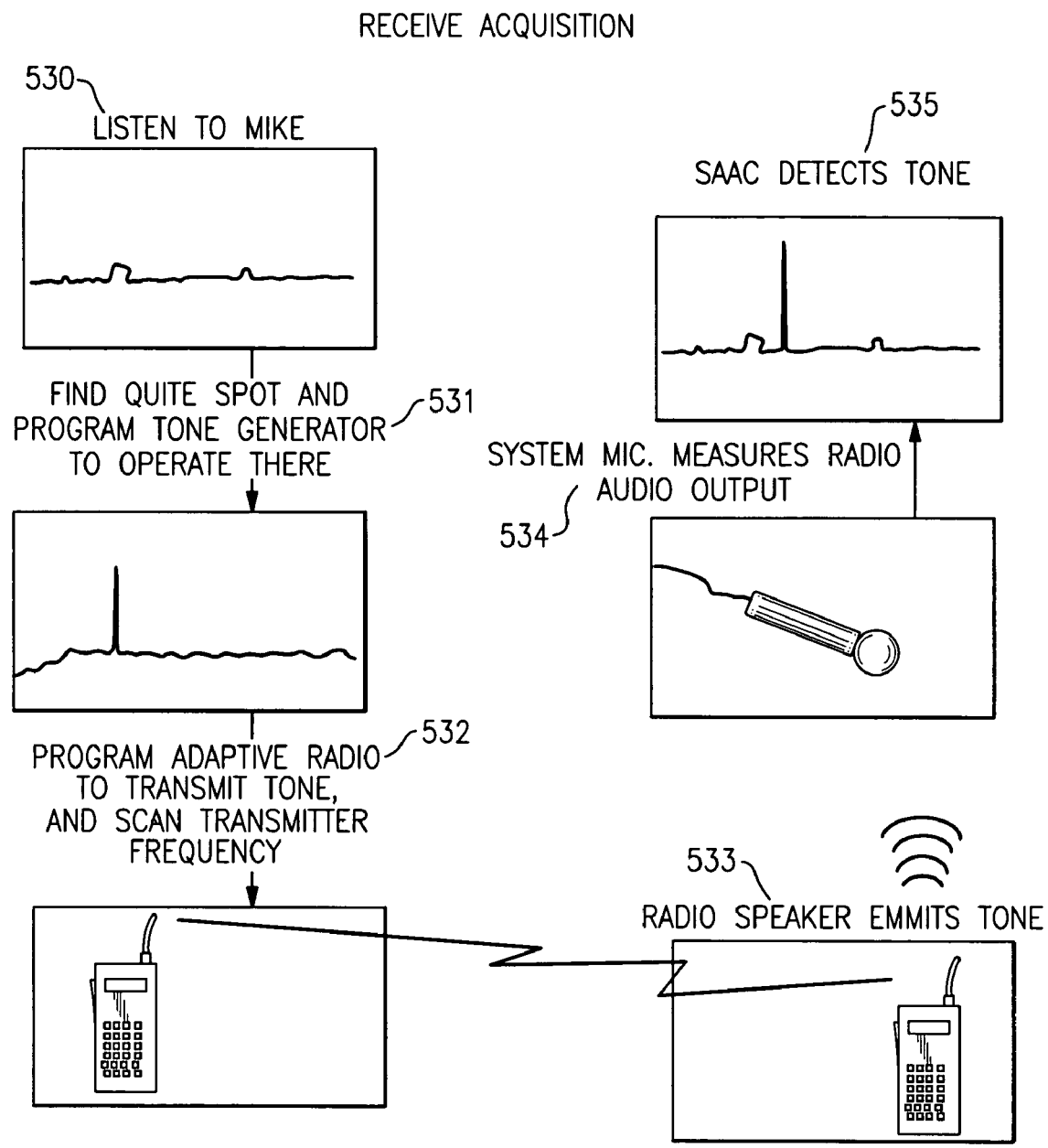
FIG. 10 shows a method for receive acquisition in accordance with an embodiment of the present invention.

FIG. 10 shows a method for radio acquisition when an agency radio employs an offset radio, i.e., when the agency radio employs a different transmit and receive frequency. In this case, the auto acquire system is programmed to search for the receive frequency. In step 530, the agency radio is placed within audio range of the microphone disposed in host console communications package 902 (See FIG. 1). The audio spectrum is measured to determine an audio frequency band that is relatively quiet. The auto acquisition routine generates a tone within the quiet frequency band. The tone is directed into the audio input of the transmitter portion of card 32. The radio card 32 is programmed to transmit the tone in step 531. In step 532, the transmit side of card 32 is stepped through a list of common frequencies. The receive frequency is found when the agency radio 533 detects the tone. The auto acquisition routine 120 determines the agency receiver frequency when the agency radio responds by emitting the transmitted tone. When the tone is emitted, the console microphone detects the tone emitted by the agency radio and directs the information to master DSP card 40. Master DSP card 40 compares the emitted tone to the tone transmitted by radio card 32. If they match, the software concludes that the agency radio received the tone transmitted by the software radio. For repeater operation the receive and transmit modes are the same except for a frequency offset. Most repeater systems use common frequency offsets. If the receiver frequency is known, the transmitter frequency is typically offset by a known frequency. However, there are some fielded systems that do not use common frequency offsets and for these a broadband search is performed. Often the agency's radio will have spurious responses. In these cases, the system 10 transmit power is lowered, and the response tested again. The most sensitive response is determined to be the proper receive frequency.

Figure 11:
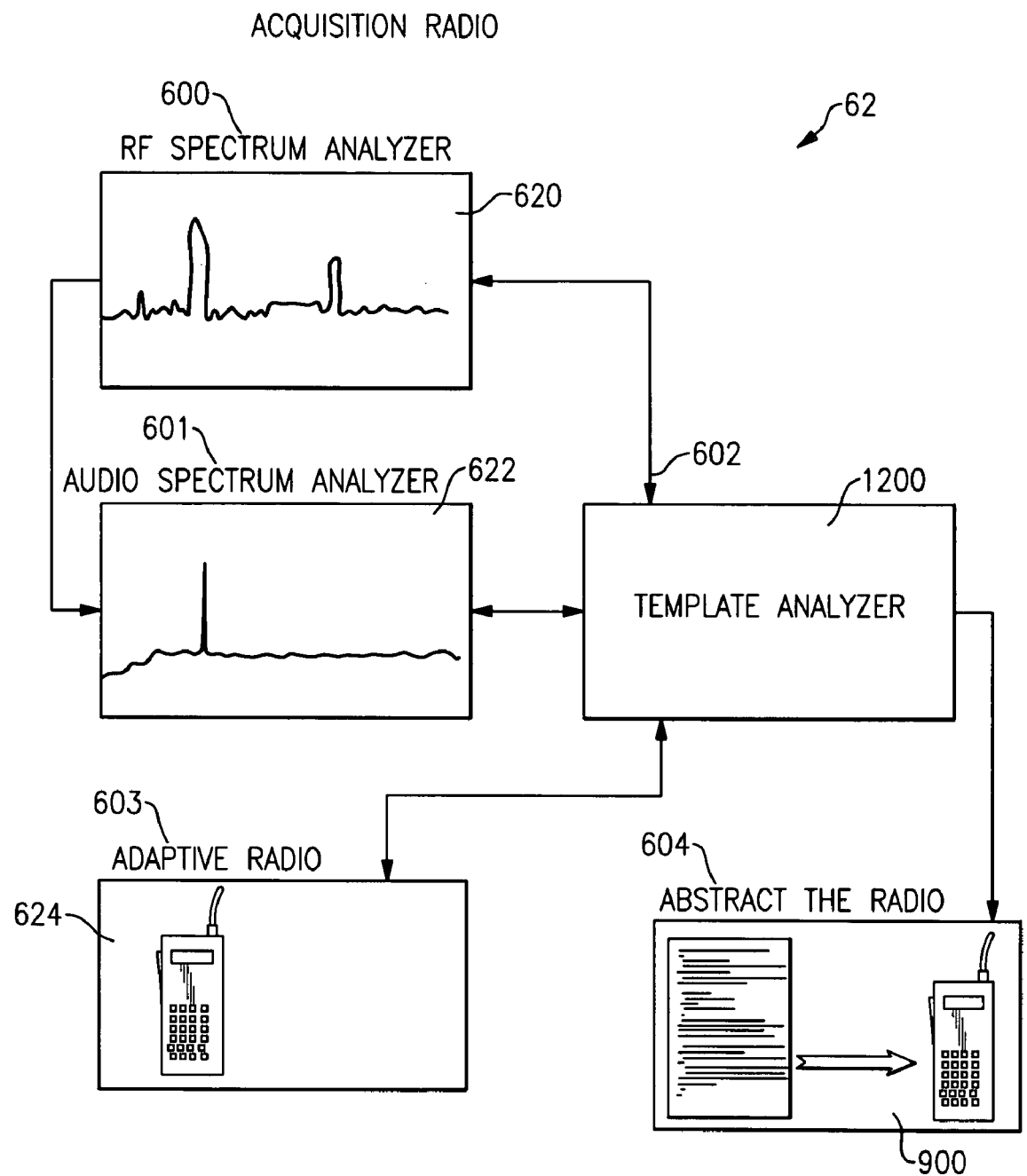
FIG. 11 is diagram illustrating an acquisition radio in accordance with an embodiment of the present invention.

Referring to FIG. 11, a diagram illustrating the auto-acquisition routine depicted in FIG. 7A is shown. The acquisition radio is a radio DSP card 32 programmed to include software implemented components such as RF spectrum analyzer 620, audio spectrum analyzer 622, in addition to the adaptive radio 624 typically programmed into DSP card 32. The acquiring card 32 is coupled to acquisition routine template analyzer 1200. Spectrum analyzer 620 is configured to locate the frequency(ies) of unknown agency radio(s). Spectrum analyzer 620 measures the signal parameters of an acquired signal and provides the measured parameters to template analyzer 1200. The audio spectral analyzer 622 measures the audio spectrum of the received signal. This data is also provided to template analyzer 1200. Template analyzer 1200 compares the measured parameters to template parameters stored in memory. As described above, auto acquisition routine 120 is programmed to derive the modulation type (FM in this case), FM deviation and the PLT for FM signals. Once the signal parameters are acquired, the template analyzer is programmed to configured the adaptive radio portion 624 of radio card 32. Subsequently, card 32 is tested in the manner described in the text associated with FIG. 9. Finally, the acquired signal characteristics are provided to the operator via the GUI. The GUI is programmed to "abstract" the acquired characteristics. The abstract is human readable data that includes a translation of all acquired parameters into radio terminology and units the operator will understand. The GUI performs this function using software modules commonly referred to as "wizards".

Figure 12:
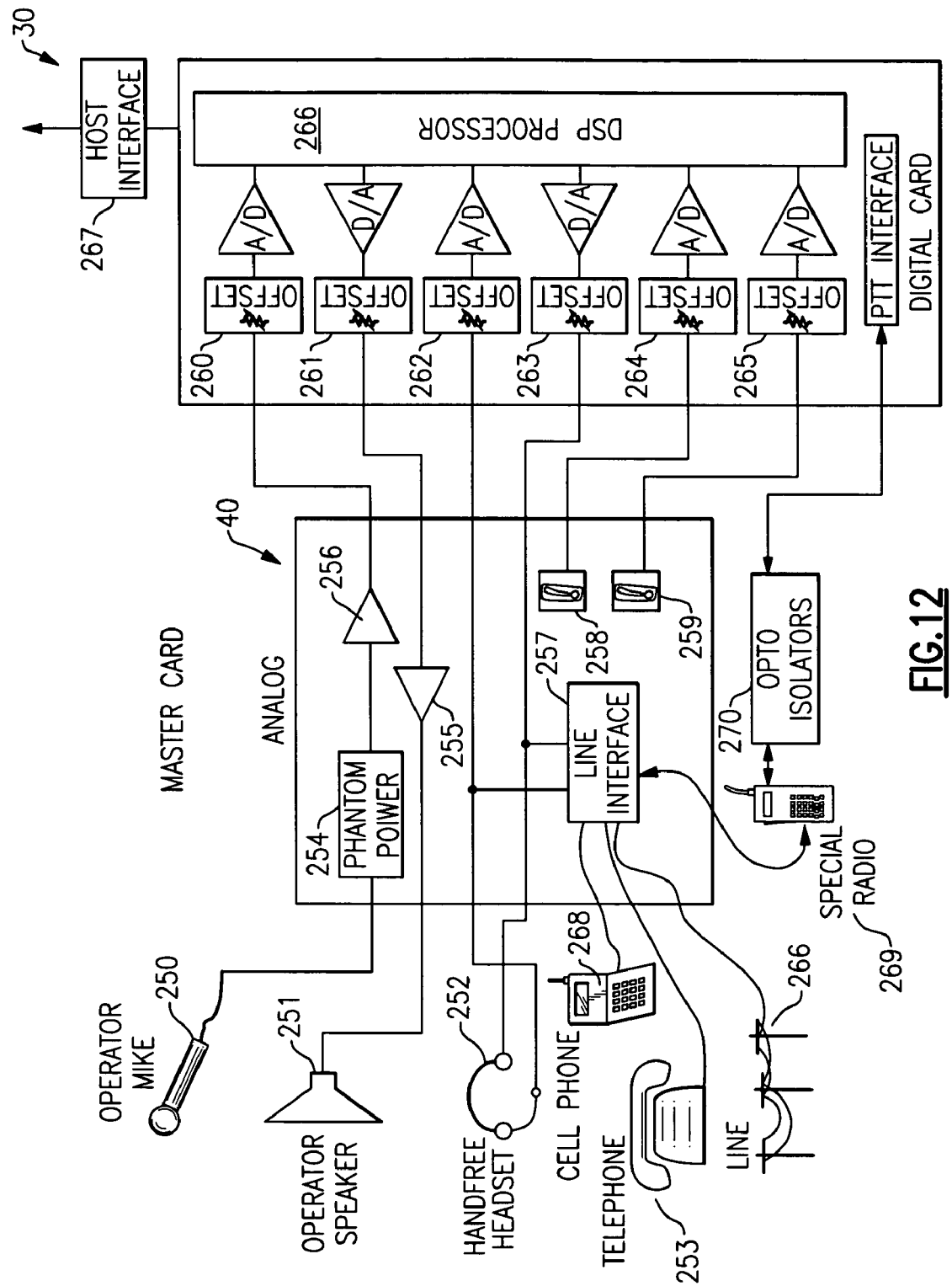
FIG. 12 is a diagram of the master DSP card depicted in FIG. 1.

As embodied herein and depicted in FIG. 12, a diagram of the master DSP card 30 in combination with line interface card 40, as depicted in FIG. 1 is shown. The master operates autonomously from the Host. The host configures the peripherals and programs the DSP cards to emulate the required radio functionality. After this the master operates much like the radios and performs the required patching and processing functions. The analog portion includes an operator interface that provides a microphone 250 and a speaker 251. The interface provides full duplex communications, enabling the user to be employed as a dispatch center. Microphone 250 has several modes of operation, such as push to talk (PTT), hands free, and PTT with squelch. Mode control is configured via the GUI. Microphone 250 input is compatible with a wide variety of microphones, including phantom powered microphones and dynamic low impedance microphones. Microphone 250 is coupled to phantom power circuit 254 and amplifier 256, which is used to buffer microphone 250 and remove DC bias. Microphone 250 is DC coupled to enable the DSP 402 to detect PTT using a conventional microphone. Phantom power circuit 254 provides microphone power through the microphone cable allowing the system to work with many of the new types of microphones currently available in the marketplace. In one embodiment, the operator interface includes audio amplifier 255 which provides 1 W of audio output to speaker 251. Amplifier 255 may also provide low level output to drive amplified speakers.

Card 40 includes a line interface circuit 257. The line interface circuit 257 is shared by hands-free 252, conventional POTS telephone 253, and cell phone 268. Line interface 257 may be configured by the operator by way of the GUI. The operator selects the mode of operation from an agency list, and the interface is configured to adapt to the selected mode. The selected device is inserted into the jacks provided in interface 257. The selected telephonic device may be added to talk groups, in the same manner as a radio would. Cell phone 268 and telephone 253 operation must use the built-in VOX, but the hands-free headset 252 can be programmed for PTT if desired. The line interface 257 provides line and lightning protection when connected to telephone land lines. Of course, line interface 257 enables the radio operators to access various telephone networks outside the radio coverage area.

Line interface 257 also includes special radio interface 269. Interface 269 is included to enable interfacing with radios not stored in database 110. For example, operating parameters of classified military radios would not be stored in database 110. The system provides scaleable audio input and output as well as opto-isolated PTT signals, three separately controllable outputs, and three separately readable inputs. Interface 269 also provides for VOX operation with the special radio if a PLT output is not available.

Card 40 also includes temperature monitors 258, 259. Temperature monitors 258, 259 are incorporated to monitor the ambient temperature within the system 10 housing. There are two levels of electronics disposed within the system enclosure. One sensor measures the temperature in the upper portion of the enclosure, while the other sensor measures the temperature in a bottom portion of the enclosure. As shown, analog values are converted into digital values by an A/D converter. The temperature monitor outputs are displayed by the GUI. In some situations, the system 10 hardware may be remote from the host 90 (See FIG. 1). Temperature sensor 258, 259 enable an operator to remotely monitor ambient conditions.

The system enclosure includes variable speed fans disposed in the system chassis. Sound pollution is minimized by having the fans run only as fast as required. Under most conditions the fans are inaudible. Variable speed fans keep system 10 at a nearly constant temperature (54° C./130° F.±2° C.). Maintaining a constant temperature improves system stability.

Each analog input interfaces with DSP card 30 by an A/D converter (260, 262, 264, 265). Digital outputs are provided to daughter card 40 by way of a D/A converter (261, 263). Accordingly, signal processing of all of the above described inputs and outputs is performed by DSP 266, which is disposed on digital portion 402.

As described previously, command and control data may be provided to master DSP card 30 by host 90, via host interface link 267. Host interface 267 provides master DSP card 30 with control and patching data. System 10 status data is transmitted from interface 267 to host 90 via link 267. In the event that host computer 90 is missing, or inoperable, no data will be transmitted over link 267. However, system 10 is configured to continue to operate in its last configuration if interface 267 is silent.

Figure 13:
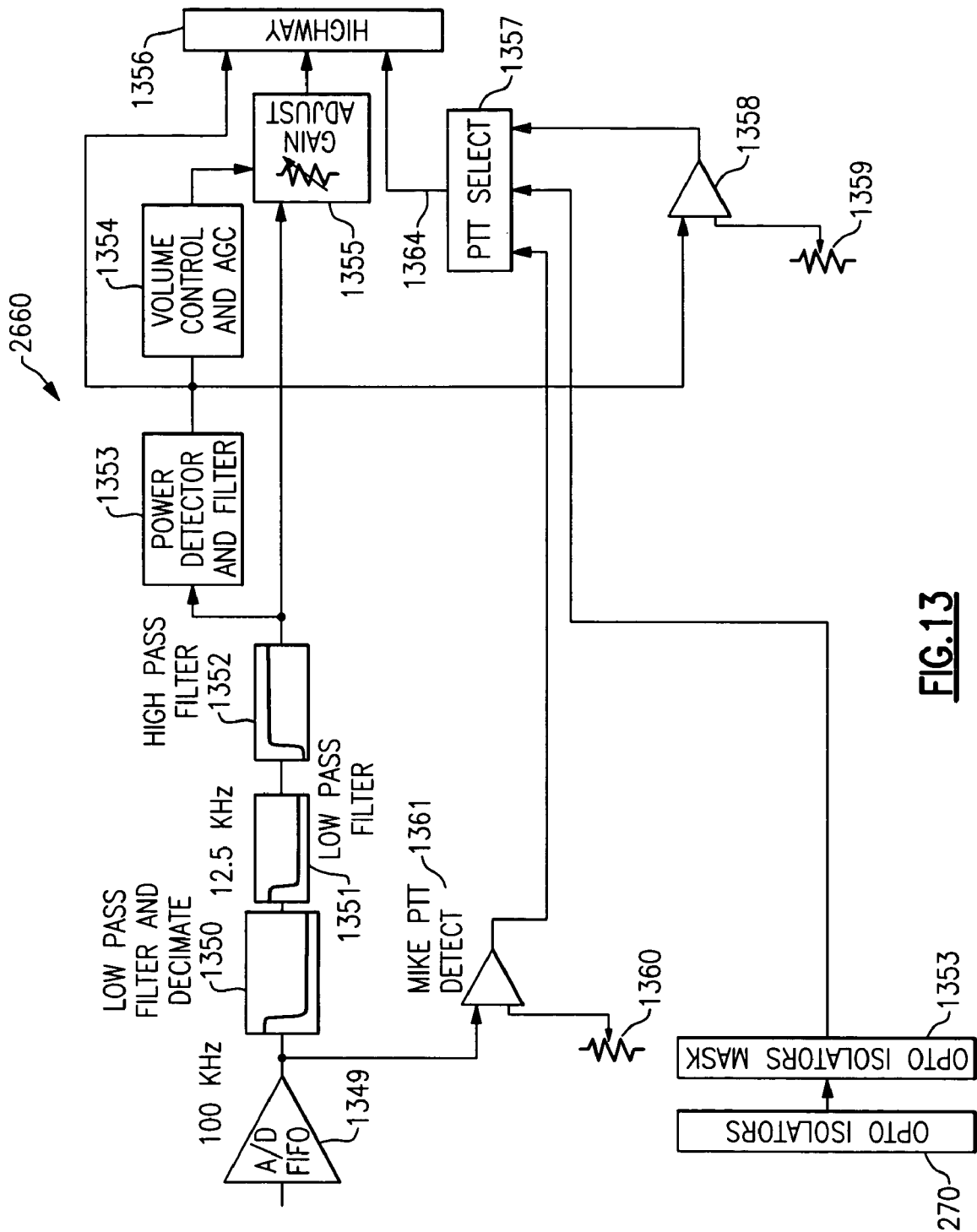
FIG. 13 is a detail view of the master DSP card microphone input circuitry.

FIG. 13 is a detail view of the master DSP card microphone input processing module 2660. A/D converter/FIFO 1349 samples the microphone audio signal at 100 kHz, which is well above the Nyquist sampling rate. The digital audio is directed into down-sampling filter 1350 where the digital audio is decimated. As a result, the sampling rate is reduced to a 12.5 kHz. The digital audio is directed into filter 1351. The audio pass band of filter 1351 is selected by the operator. The filtered digital signal is directed into high pass filtered 1352. Filter 1352 is configured to remove any audio tones that may interfere with agency radio private line tones (PLT). The gain is adjusted by gain adjustment module 1355. The adjusted digital audio is written into console highway buffer 1356. Note that the output of A/D FIFO is also directed to comparator 1361. If the value exceeds threshold 1360, the PTT select flag is set.

The audio may be manually adjusted or adjusted in AGC mode. In manual mode, the gain is adjusted by the operator by way of the GUI. In AGC mode, the gain is adjusted to a preset level by the DSP. In particular, power detector 1353 measures the audio level, and the gain is adjusted by AGC module 1354 in accordance with the level set by the GUI. The audio level setting may be written into a highway buffer upon request by host 90. The power level of the signal output from module 1353 is directed into comparator 1358. In hands-free mode, or in VOX mode, the power level may set the PTT flag in the console buffer if it exceeds a preset threshold level 1359. Opto-isolator inputs 270 may also be used to set the PTT flag 1364 if the opto-isolators are used to patch external radios, or when an external key is employed.

Figure 14:
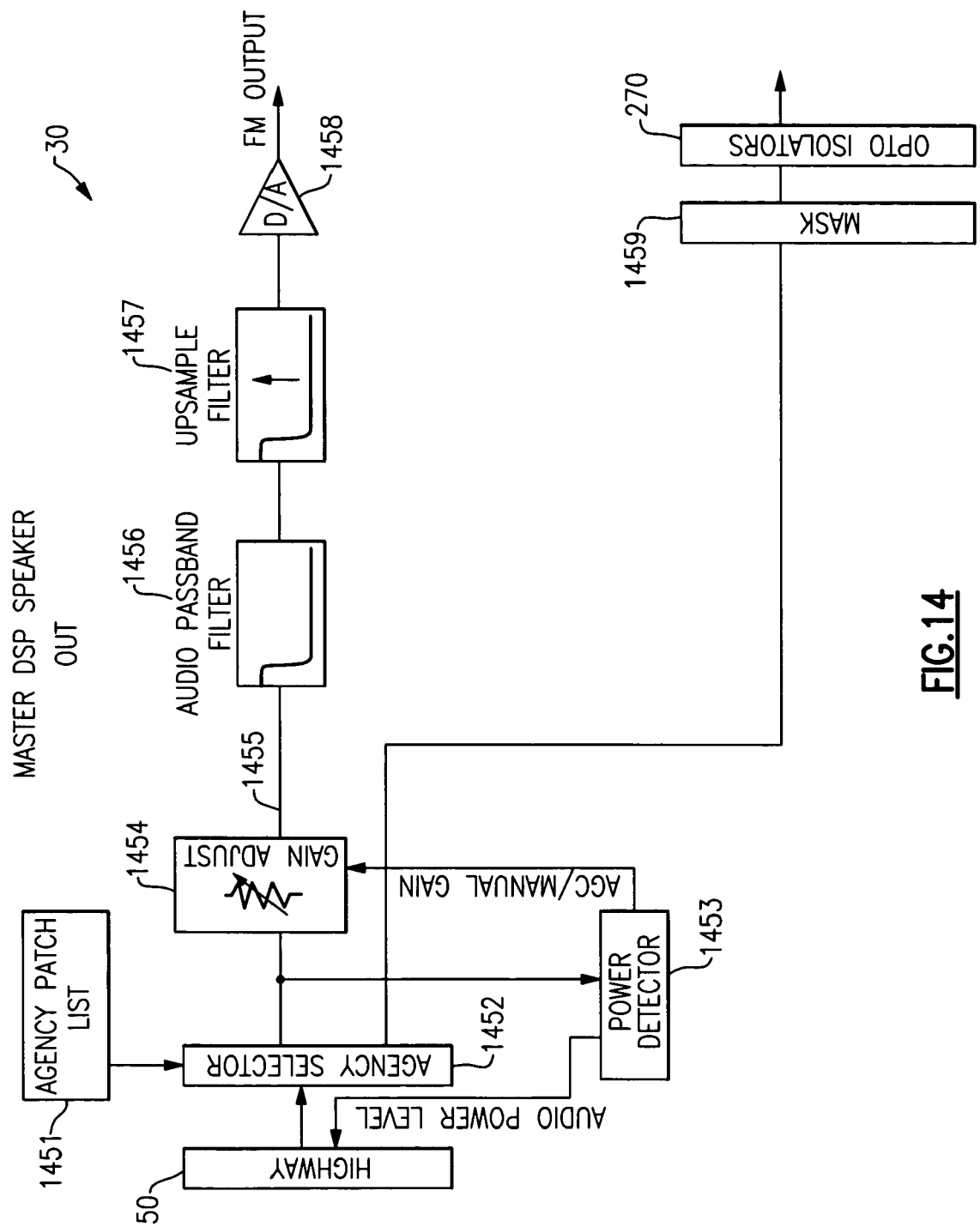
FIG. 14 is a detail view of the master DSP card speaker output circuitry.

FIG. 14 is a detail view of the master DSP card 30 speaker output processor module. Digital audio is provided to card 30 by digital highway 50. Digital highway 50 transmits the digital audio for each and every software radio in system 10, in the manner previously described. The agency selector 1452 monitors all the agencies assigned to console 902 by patch list 1451. Selector 1452 and list 1451 are similar to the modules employed by radio DSP cards 60 (See FIG. 2A). The priority of the agency's patching is determined by its order in the list. Opto isolators 270 are used to key external radios or devices when the console becomes active. Opto-isolators are enabled based on the mask setting 1459, which is programmed by the operator via the GUI.

The power level of the audio output is computed for the selected audio in the power detector module 1453. The detected power level is written back into a highway buffer 1450. The detected power level is used by the GUI to balance the volume level to thereby maintain an optimal and constant volume level for all patches. The gain for the audio output is adjusted by gain control module 1454. Audio bandpass filter 1456 limits the bandwidth of the digital audio output to the bandwidth selected via the GUI. The digital audio is directed into sample filter 1457. The filtered audio is directed into D/A converter 1458. The analog audio signal is transmitted to speaker 251 or headset 252 (FIG. 12).

Referring back to FIG. 12, hands-free 252 and line interface 257 are inserted into the auxiliary channel (262, 263). Because the analog signals provided to/from each of these devices are identical, the DSP code employed to process these signals is the same. In one embodiment, the software code used to process console 902 communications is full duplex, whereas the DSP code for the auxiliary channel 262, 263 merely supports simplex communications. Those of ordinary skill in the art will recognize that simplex communication was chosen for these operations because it reduces the chance of feedback and system lockup.

For hands-free operation, the GUI is used by the operator to program the voice operated switch (VOX) to be the only function required to enable transmission. The VOX level 359 (FIG. 13) may be set above the ambient noise and below the voice level of the operator. The hands-free headset 252 may be inserted into the line out and line in jacks of the console 902.

Figure 15:
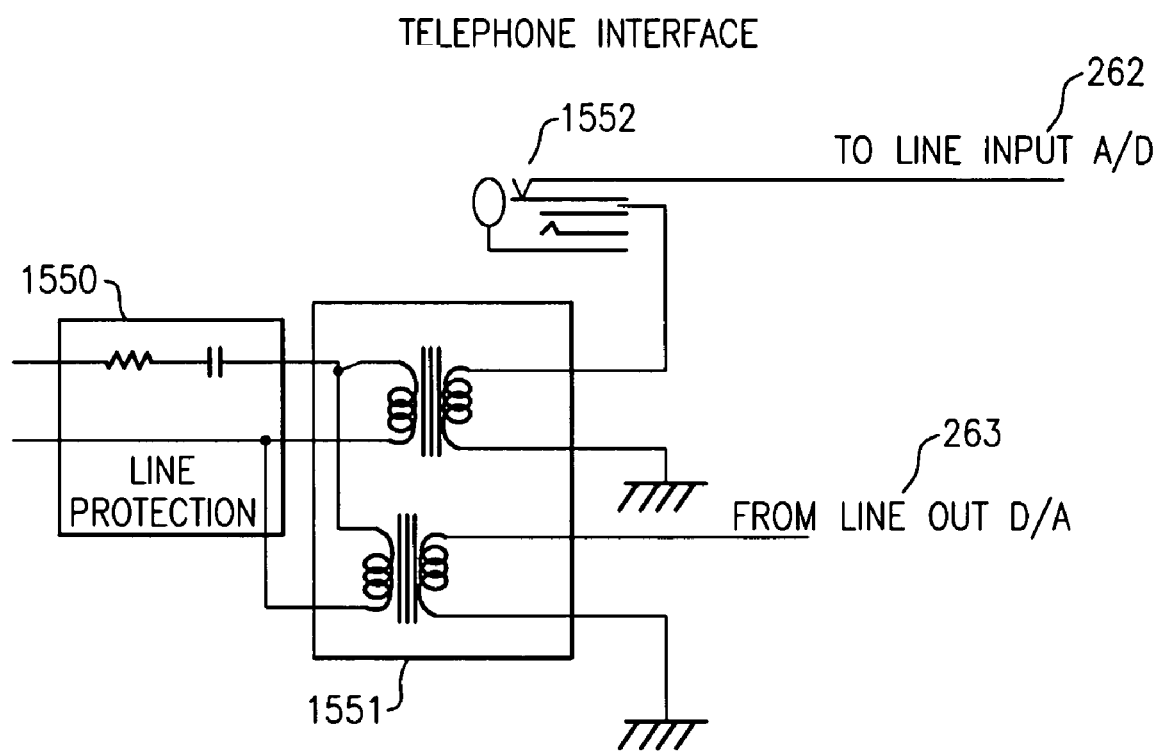
FIG. 15 is a detail view of the master DSP card line interface circuit.

FIG. 15 is a detail view of the master DSP card line interface circuit. Protection circuit 1550 is configured to protect system 10 from transient signals propagated by the telephony network. The transients may be caused by lightening or other such phenomena. Isolation transformers 1551 are used to isolate SAAC from the phone line. All transformers provide DC isolation between isolated windings. However, transformers may couple high frequency signals and noise into system 10. Isolation transformers 1551 are designed to minimize this coupling by minimizing capacitive coupling, by using shielding, or by both methods. The wide dynamic range (100+dB) of the processor 266 allows all signal conditioning and matching to be done in software.

Cell phone 268 also accesses system 10 by way of line interface 257. A cable is used to connect the line in and out jacks to the microphone and speaker connections on the cell phone. VOX mode is used to control TX/REC operation. The wide dynamic range (100+dB) of the processor allows all signal conditioning and matching to be done in software.

Special Radio interface 269 also accesses system 10 by way of line interface 257. Again, a cable connects the line in/line out jacks to the microphone and speaker connections on the radio. Either the VOX mode or hardware PTT can be used to control TX/REC operation. The wide dynamic range (100+dB) of the processor allows all signal conditioning and matching to be done in software. Opto-isolator outputs (3 in and 3 out) are provided to control the radio hardware and power amps if available. The output opto-isolators allow external keying of devices. The input opto-isolators allow for detection of activity on the channel by the radio's circuitry. This allows for a higher quality connection to be made by reducing TX/REC latencies.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A software defined radio communications system comprising:
    a first programmable circuit programmed to convert a first digital audio signal into a first analog transmit signal and convert a first analog receive signal into a first digital receive signal, the first analog transmit signal and the first analog receive signal conforming to a first set of radio signal parameters characterizing a first radio communications channel;
    at least one second programmable circuit coupled to the first programmable circuit, the at least one second programmable circuit being programmed to convert at least one second digital transmit signal into at least one second analog transmit signal and convert at least one second analog receive signal into at least one second digital receive signal, the at least one second analog transmit signal and the at least one second analog receive signal conforming to at least one second set of radio signal parameters characterizing at least one second radio communications channel, the first programmable circuit and the at least one second programmable circuit being identical;
    a digital highway coupling the first programmable circuit and the at least one second programmable circuit, the first digital receive signal being provided to any one of the at least one second programmable circuits and the at least one second digital receive signal being provided to the first programmable circuit; and
    a control system configured to program the first programmable circuit to conform to the first set of radio signal parameters, to program the at least one second programmable circuit to conform to the at least one second set of radio signal parameters, and to program the first programmable circuit and the at least one second programmable circuit to conform to a predetermined radio communications channel patching arrangement.

2. The system of claim 1, wherein the at least one second programmable circuit includes at least one second memory buffer coupled to the digital highway, the first digital receive signal being stored in the at least one second memory buffer via the digital highway.

3. The system of claim 2, wherein the at least one second programmable circuit is programmed to read the first digital receive signal from the at least one second memory buffer and convert the first digital receive signal into the at least one second analog transmit signal for retransmission over the at least one second radio communications channel.

4. The system of claim 1, wherein the first programmable circuit includes a first memory buffer coupled to the digital highway, the at least one second digital receive signal being stored in the first memory buffer via the digital highway.

5. The system of claim 4, wherein the first programmable circuit is programmed to read the at least one second digital receive signal from the first memory buffer and convert the at least one second digital receive signal into the first analog transmit signal for retransmission over the first radio communications channel.

6. The system of claim 1, wherein the at least one second programmable circuit includes a plurality of programmable circuits, each of the plurality of programmable circuits being programmed to convert each digital signal received via the digital highway into a corresponding analog transmit signal, each of the plurality of programmable circuits being programmed to convert each analog receive signal into a corresponding digital receive signal for propagation on the digital highway to thereby provide the corresponding digital receive signal to each of the first programmable circuit and the plurality of programmable circuits for retransmission on any or all of the first radio communications channel and/or the at least one second radio communications channel, the analog transmit signal and the analog receive signal for each radio circuit conforming to a set of radio signal parameters defining a radio communications channel.

7. The system of claim 1, wherein the first set of radio signal parameters and the at least one second set of radio signal parameters are selected from a group of parameters comprising modulation format, carrier frequency, signal bandwidth, PLT frequency, FM deviation, RF transmission power, and/or audio bandwidth.

8. The system of claim 1, wherein each programmable circuit further comprises:
a memory segmented to include,
a control data portion configured to store programmable circuit command data from the control system,
a real time data portion configured to store digital transmit signals received via the digital highway, and
a radio circuit write buffer configured to provide the digital highway with digital receive signals; and
a read/write controller coupled between the memory and the digital highway configured to control an exchange of the digital transmit signals and digital receive signals between the programmable circuit and the digital highway.

9. The system of claim 7, wherein the digital transmit signals and the digital receive signals are audio signals.

10. The system of claim 1, wherein the first analog transmit signal, the first analog receive signal, the at least one second analog transmit signal, and the at least one second analog receive signal are compatible with direct FM, AM, or a quadrature carrier modulation format.

11. The system of claim 10, wherein the quadrature carrier multiplexing modulation format is selected from a group comprising quadrature FM, single sideband (SSB), or vestigial sideband (VSB), continuous phase frequency shift keying (CPFSK), bi-phase shift keying (BPSK), offset quadrature phase shift keying (OQPSK), and/or quadrature amplitude modulation (QAM).

12. The system of claim 1, wherein the control system further comprises an auto-acquisition module, the auto-acquisition module being configured to receive an agency radio analog receive signal, extract a set of agency radio signal parameters from the agency radio analog receive signal, and reprogram one of the first programmable circuit or at least one second programmable circuit in accordance with the set of agency radio signal parameters.

13. The system of claim 12, wherein the auto-acquisition module stores the extracted set of agency radio signal parameters in a database.

14. The system of claim 12, wherein the auto-acquisition system includes an RF spectrum analyzer, an audio spectrum analyzer, a radio signal parameter template analyzer, and an auto-acquisition module.

15. The system of claim 1, wherein the control system further comprises a host computer, the host computer further comprising:
an operating system;
a radio patching control module coupled to the operating system; and
a graphical user interface coupled to the radio patching control module, the graphical user interface being configured to transmit operator command data to the first programmable circuit and the at least one second programmable circuit and receive status data from the first programmable circuit and the at least one second programmable circuit.

16. The system of claim 15, further comprising a database coupled to the control system, the database including a computer-readable medium having stored thereon a data structure, the data structure including a first field containing data representing an agency identifier and at least one second field containing data representing a set of the agency's radio signal parameters.

17. The system of claim 1, further comprising:
a first RF system coupled to the first programmable circuit, the first RF system being configured to transmit the first analog transmit signal and receive the first analog receive signal via the first radio communications channel; and
at least one second RF system coupled to the at least one second programmable circuit, the at least one second RF system being configured to transmit the at least one second analog transmit signal and receive the at least one second analog receive signal via the at least one second radio communications channel.

18. The system of claim 17, wherein the first RF system and/or the at least one second RF system are configured to support a plurality of modulation formats selected from a group comprising amplitude modulation (AM), frequency modulation (FM), and/or quadrature carrier multiplexing modulation.

19. The system of claim 18, wherein the quadrature carrier multiplexing modulation format is selected from a group comprising quadrature FM, single sideband (SSB), or vestigial sideband (VSB), continuous phase frequency shift keying (CPFSK), bi-phase shift keying (BPSK), offset quadrature phase shift keying (OQPSK), and/or quadrature amplitude modulation (QAM).

20. The system of claim 17, further comprising a third programmable circuit programmed by the control system to convert audio signals received from a user microphone to digital receive signals, transmit the audio signals to a user speaker and/or convert the audio signals to digital transmit data, process full duplex telephony signals for retransmission over the first radio communications channel and/or the at least one second radio communications channel, and to transmit and receive data to/from the control system, the first programmable circuit, the at least one second programmable circuit, and the third programmable circuit being identical.

21. The system of claim 20, further comprising an interface system coupled to the third programmable circuit, the interface system including a microphone audio input circuit, a speaker output circuit, a telephonic line interface circuit, and a control system interface circuit.

22. The system of claim 20, wherein the control system programs the first programmable circuit based on the configuration of the first RF system, programs the at least one second programmable circuit based on the configuration of the at least one second RF system, and programs the third programmable circuit based on the configuration of the interface system.

23. The system of claim 1, wherein the control system is configured to dynamically reprogram either or both of the first programmable circuit and/or the at least one second programmable circuit to conform to any predetermined set of radio signal parameters, and to conform to a predetermined radio communications channel patching arrangement.

24. The system of claim 1, wherein the control system is configured to dynamically route digital audio signals between the first radio signal processor and the at least one second radio signal processor.

25. The system of claim 1, further comprising a third programmable circuit programmed by the control system to convert external receive signals received from an external device to digital receive signals and convert digital transmit signals into external transmit signals for transmission to the external device, the first programmable circuit, the at least one second programmable circuit, and the third programmable circuit being identical.

26. The system of claim 25, further comprising an interface system coupled to the third programmable circuit, the interface system including at least one interface circuit configured to communicate with the external device.

27. The system of claim 26, wherein the at least one external communications device includes an analog telephone set.

28. The system of claim 26, wherein the at least one external communications device includes a wireless telephone.

29. The system of claim 26, wherein the at least one external communications device includes a hands-free headset.

30. The system of claim 26, wherein the at least one external communications device includes a telecommunications network.

31. The system of claim 30, wherein the host computer is remotely linked to the at least one processor via the telecommunications network.

32. The system of claim 30, wherein the telecommunications network includes a local area network (LAN).

33. The system of claim 25, wherein the first programmable circuit, the at least one second programmable circuit, and the third programmable circuit include a digital signal processor, an ASIC, and/or a FPGA.

34. A software defined radio communications system comprising:
a first programmable radio programmed to convert a first digital audio signal into a first analog transmit signal and convert a first analog receive signal into a first digital receive signal, the first analog transmit signal and the first analog receive signal conforming to a first set of radio signal parameters characterizing a first radio communications channel, the first programmable radio being configured to transmit the first analog transmit signal and receive the first analog receive signal via the first radio communications channel;
at least one second programmable radio coupled to the first programmable circuit, the at least one second programmable circuit being programmed to convert at least one second digital transmit signal into at least one second analog transmit signal and convert at least one second analog receive signal into at least one second digital receive signal, the at least one second analog transmit signal and the at least one second analog receive signal conforming to at least one second set of radio signal parameters characterizing at least one second radio communications channel, the at least one second programmable radio being configured to transmit the at least one second analog transmit signal and receive the at least one second analog receive signal via the at least one second radio communications channel;
a digital highway coupling the first programmable radio and the at least one second programmable radio, the first digital receive signal being provided to any one of the at least one second programmable radios and the at least one second digital receive signal being provided to the first programmable radio; and
a control system configured to program the first programmable radio to conform to the first set of radio signal parameters, to program the at least one second programmable radio to conform to the at least one second set of radio signal parameters, and to program the first programmable radio and the at least one second programmable radio to conform to a predetermined radio communications channel patching arrangement.

35. The system of claim 34, wherein the first programmable radio further comprises:
a first programmable circuit configured to process digital and analog signals at a baseband frequency and/or at an intermediate frequency; and
a first RF equipment coupled to the first programmable circuit via the baseband frequency and/or the intermediate frequency, the first RF equipment also being configured to transmit and receive signals over the first radio communications channel at a first RF frequency band.

36. The system of claim 35, wherein the first programmable radio further comprises:
at least one second programmable circuit configured to process digital and analog signals at a baseband frequency and/or at an intermediate frequency; and
at least one second RF equipment coupled to the at least one second programmable circuit via the baseband frequency and/or the intermediate frequency, the at least one second RF equipment also being configured to transmit and receive signals over the at least one second radio communications channel at least one second RF frequency band.

37. The system of claim 36, further comprising a third programmable circuit programmed by the control system to convert external receive signals received from an external device to digital receive signals and convert digital transmit signals into external transmit signals for transmission to the external device, the first programmable circuit, the at least one second programmable circuit, and the third programmable circuit being identical.

38. The system of claim 37, further comprising an interface system coupled to the third programmable circuit, the interface system including at least one interface circuit configured to communicate with the external device.

39. A computerized method for establishing RF communications, the method comprising:
providing a first programmable radio and at least one second programmable radio;
receiving a first RF receive signal with the first programmable radio;

converting the first RF receive signal into a first analog receive signal, the first RF receive signal and the first analog receive signal conforming to a first set of signal parameters characterizing a first radio communications channel;

converting the first analog receive signal into at least one second digital audio transmit signal;

converting the at least one second digital audio transmit signal into at least one second analog transmit signal, the at least one second analog transmit signal conforming to at least one second set of communications characteristics characterizing at least one second radio communications channel; and converting the at least one second analog transmit signal into at least one second RF transmit signal for transmission over the at least one second radio communications channel.

40. The method of claim 39, further comprising:

receiving a subsequent at least one second RF receive signal from the at least one second programmable radio;

converting the at least one second RF receive signal into at least one second analog receive signal, the at least one second RF receive signal and the at least one second analog receive signal conforming to the at least one second set of signal parameters;

converting the at least one second analog receive signal into a first digital audio transmit signal;

converting the first digital audio transmit signal into a first analog transmit signal, the first analog transmit signal conforming to the first set of communications characteristics; and converting the first analog transmit signal into a first RF transmit signal for transmission over the first radio communications channel.

41. The method of claim 39, wherein the at least one second programmable radio includes a plurality of programmable radios.

42. The method of claim 40, further comprising:

sweeping a band of frequencies in the electromagnetic spectrum;

detecting a third RF signal within the band of frequencies;

extracting a third set of radio signal parameters from the radio signal, the third set of radio signal parameters characterizing a third radio communications channel; and programming one of the plurality of programmable radios to process signals conforming to the third set of radio signal parameters.

43. The method of claim 42, further comprising:

receiving the third RF signal;

converting the third RF signal into a third digital audio receive signal;

converting the third digital audio receive signal into a first analog transmit signal, the first analog transmit signal conforming to the first set of communications characteristics; and converting the first analog transmit signal into a first RF transmit signal; and transmitting the first RF transmit signal over the first radio communications channel.

44. The method of claim 43, further comprising:

receiving a first RF receive signal over the first radio communications channel;

converting the first RF receive signal into a first analog receive signal;

converting the first analog receive signal into a third digital audio transmit signal;

converting the third digital audio transmit signal into a third analog transmit signal;

converting the third analog transmit signal into a third RF transmit signal; and transmitting the third RF transmit signal over the third radio communications channel.

45. In a computerized RF communications system having a first radio signal processor, a second radio signal processor, a database, and a graphical user interface including a display and a data input device, a method for establishing communications between a first radio characterized by a first set of radio signal parameters and a second radio characterized by a second set of radio signal parameters, the method comprising:

selecting a first template from the database, the first template including instructions to program a radio signal processor in accordance with the first set of radio signal parameters;

applying the first template to the first radio signal processor, the first radio signal processor being programmed to convert a first digital audio transmit signal into a first analog transmit signal, and convert a first analog receive signal into a first digital audio receive signal, the first analog transmit signal and the first analog receive signal conforming to the first set of radio signal parameters;

selecting a second template from the database, the second template including instructions to program a radio signal processor in accordance with the second set of radio signal parameters;

applying the second template to the second radio signal processor, the second radio signal processor being programmed to convert a second digital audio transmit signal into a second analog transmit signal, and convert a second analog receive signal into a second digital audio receive signal, the second analog transmit signal and the second analog receive signal conforming to the second set of radio signal parameters; and patching the first radio signal processor and the second radio signal processor.

46. The method of claim 45, further comprising:

receiving a first RF receive signal from a first radio;

converting the first RF receive signal into a first analog receive signal, the first RF receive signal and the first analog receive signal conforming to a first set of signal parameters;

converting the first analog receive signal into a second digital audio transmit signal;

converting the second digital audio transmit signal into a second analog transmit signal, the second analog transmit signal conforming to a second set of communications characteristics; and converting the second analog transmit signal into a second RF transmit signal for transmission to a second radio.

47. The method of claim 45, further comprising:

receiving a subsequent second RF receive signal from the second radio;

converting the second RF receive signal into a second analog receive signal, the second RF receive signal and the second analog receive signal conforming to the second set of signal parameters;

converting the second analog receive signal into a first digital audio transmit signal;

converting the first digital audio transmit signal into a first analog transmit signal, the first analog transmit signal conforming to the first set of communications characteristics; and converting the first analog transmit signal into a first RF transmit signal for transmission to the first radio.

48. The method of claim 45, further comprising:

accessing the database with the data input device;

storing a third template in the data base, the third template including instructions to program a radio signal processor in accordance with a third set of radio signal parameters.

49. The method of claim 45, further comprising the step of displaying a patch list on the display device, the patch list including a list of each radio signal processor patch.

50. The method of claim 45, further comprising the step of displaying a radio signal processor status on the display device.

\* \* \* \* \*